(12) United States Patent
Trotta et al.

(10) Patent No.: US 8,608,483 B2
(45) Date of Patent: Dec. 17, 2013

(54) BREAST TISSUE MODELS, MATERIALS, AND METHODS

(75) Inventors: Thomas Neil Trotta, Marco Island, FL (US); Jennifer Anne Trotta, Marco Island, FL (US); Siobhain Lowe, Miami, FL (US)

(73) Assignee: Gaumard Scientific Company, Inc., Miami, FL (US)

( * ) Notice: Subject to any disclaimer, the term of this patent is extended or adjusted under 35 U.S.C. 154(b) by 302 days.

(21) Appl. No.: 13/031,102

(22) Filed: Feb. 18, 2011

(65) Prior Publication Data
US 2011/0207104 A1    Aug. 25, 2011

Related U.S. Application Data

(60) Provisional application No. 61/305,982, filed on Feb. 19, 2010.

(51) Int. Cl.
*G09B 23/28* (2006.01)

(52) U.S. Cl.
USPC ........................................................ 434/267

(58) Field of Classification Search
USPC .................. 434/262, 267, 272, 273
See application file for complete search history.

(56) References Cited

U.S. PATENT DOCUMENTS

| | | | |
|---|---|---|---|
| 4,001,951 A * | 1/1977 | Fasse | 434/267 |
| 4,134,218 A * | 1/1979 | Adams et al. | 434/267 |
| 4,351,344 A | 9/1982 | Stenzler | |
| 4,655,716 A * | 4/1987 | Hoevel | 434/267 |
| 4,737,109 A * | 4/1988 | Abramson | 434/267 |
| 4,867,686 A * | 9/1989 | Goldstein | 434/267 |
| 5,775,916 A * | 7/1998 | Cooper et al. | 434/267 |
| 5,853,292 A | 12/1998 | Eggert et al. | |
| 5,900,438 A | 5/1999 | Miyoshi et al. | |
| 6,068,602 A | 5/2000 | Tham et al. | |
| 6,193,519 B1 | 2/2001 | Eggert et al. | |

(Continued)

FOREIGN PATENT DOCUMENTS

| | | |
|---|---|---|
| JP | 2008/150447 A | 7/2008 |
| KR | 10/0301711 B1 | 3/2003 |

(Continued)

OTHER PUBLICATIONS

Trotta et al., U.S. Appl. No. 13/031,116, filed Feb. 18, 2011.

(Continued)

*Primary Examiner* — Kurt Fernstrom
(74) *Attorney, Agent, or Firm* — Haynes and Boone, LLP

(57) ABSTRACT

Devices, systems, and methods appropriate for use in medical training that include materials that better mimic natural human tissue are disclosed. In one aspect a polysiloxane mixture for simulating human biological tissue, especially human breast tissue, is disclosed. In another aspect, a method of manufacturing a biological tissue phantom is disclosed. In another aspect, a human breast tissue models are disclosed. In one instances, the human breast tissue model comprises a simulated breast tissue comprising a mixture of a silicone foam and a silicone oil and a simulated skin layer covering the simulated breast tissue, where the simulated breast tissue and the simulated skin layer are sized and shaped to mimic a natural human breast. In some instances, the human breast tissue model includes at least one simulated pathological structure that simulates such pathologies as a cyst, a medullary carcinoma, a ductal carcinoma, an infiltrating scirrhus carcinoma, a lobular carcinoma, and a fibroadenoma.

23 Claims, 14 Drawing Sheets

(56) References Cited

U.S. PATENT DOCUMENTS

| | | |
|---|---|---|
| 6,443,735 B1 | 9/2002 | Eggert et al. |
| 6,485,308 B1 | 11/2002 | Goldstein |
| 6,503,087 B1 | 1/2003 | Eggert et al. |
| 6,527,558 B1 | 3/2003 | Eggert et al. |
| 6,568,941 B1 | 5/2003 | Goldstein |
| 6,758,676 B2 | 7/2004 | Eggert et al. |
| 6,817,865 B2* | 11/2004 | Charbonneau ............... 434/273 |
| 6,854,976 B1* | 2/2005 | Suhr ............................ 434/273 |
| 7,114,954 B2 | 10/2006 | Eggert et al. |
| 7,272,766 B2* | 9/2007 | Sakezles ...................... 714/742 |
| 7,419,376 B2* | 9/2008 | Sarvazyan et al. ........... 434/273 |
| 7,549,866 B2* | 6/2009 | Cohen et al. ................. 434/267 |
| 7,976,312 B2 | 7/2011 | Eggert et al. |
| 7,976,313 B2 | 7/2011 | Eggert et al. |
| 8,016,598 B2 | 9/2011 | Eggert et al. |
| 2002/0076680 A1 | 6/2002 | Logan |
| 2002/0076681 A1 | 6/2002 | Leight et al. |
| 2005/0214727 A1 | 9/2005 | Stoianovici et al. |
| 2007/0050027 A1* | 3/2007 | McGhan et al. ................. 623/8 |
| 2007/0087314 A1 | 4/2007 | Gomo |
| 2007/0172804 A1 | 7/2007 | Allen et al. |
| 2007/0218442 A1 | 9/2007 | Dupuis et al. |
| 2008/0076099 A1 | 3/2008 | Sarvazyan et al. |
| 2008/0131855 A1 | 6/2008 | Eggert et al. |
| 2009/0148822 A1 | 6/2009 | Eggert et al. |
| 2011/0207102 A1 | 8/2011 | Trotta et al. |
| 2011/0207103 A1 | 8/2011 | Trotta et al. |
| 2011/0207105 A1 | 8/2011 | Eggert et al. |

FOREIGN PATENT DOCUMENTS

| | | |
|---|---|---|
| WO | WO 2008/021720 A2 | 2/2008 |
| WO | WO 2009/039210 A9 | 3/2009 |
| WO | WO 2009/088304 A1 | 7/2009 |

OTHER PUBLICATIONS

WIPO International Searching Authority, Search Report for PCT/US2011/025055, Feb. 16, 2011, 3 pages.

WIPO International Searching Authority, Search Report for PCT/US2011/025513, Feb. 18, 2011, 4 pages.

WIPO International Searching Authority, Search Report for PCT/US2011/025515, Feb. 18, 2011, 3 pages.

WIPO International Searching Authority, Search Report for PCT/US2011/025519, Feb. 18, 2011, 5 pages.

* cited by examiner

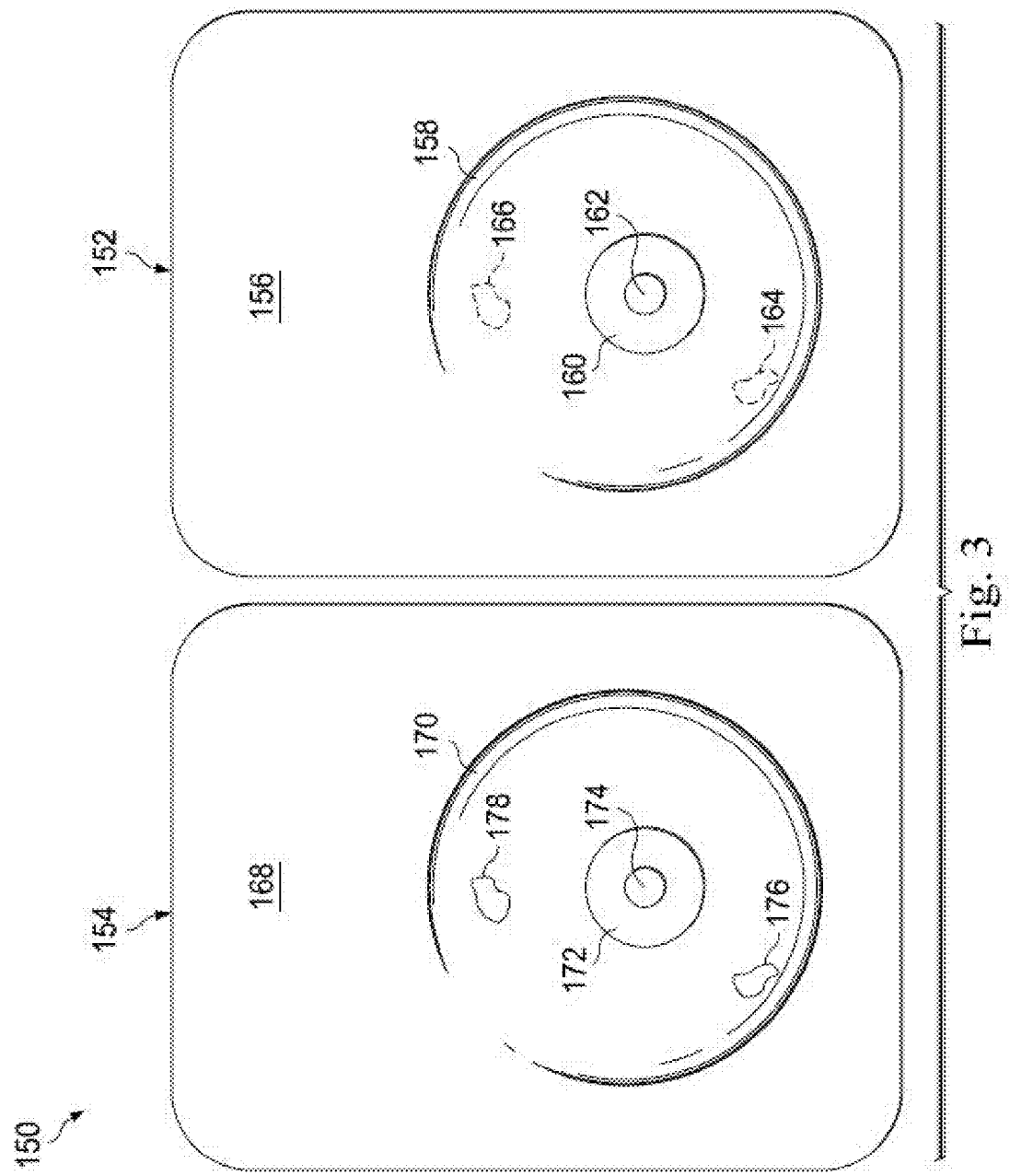

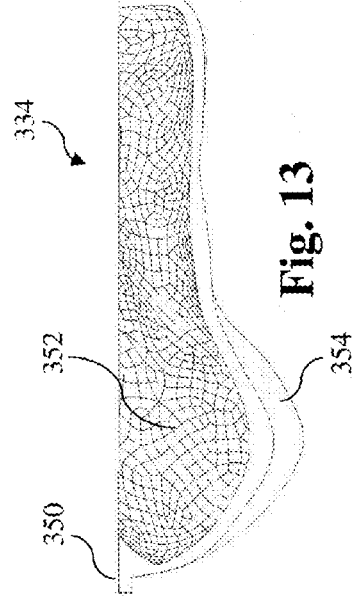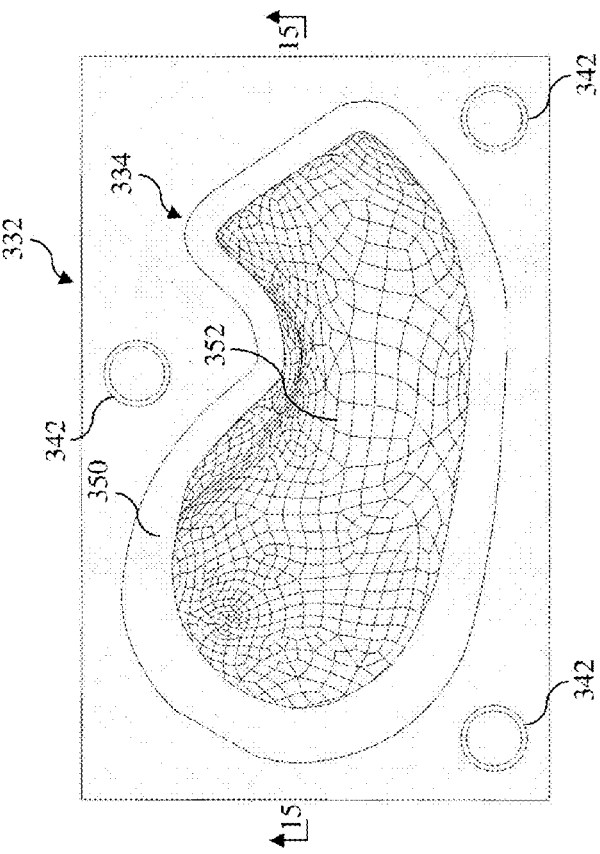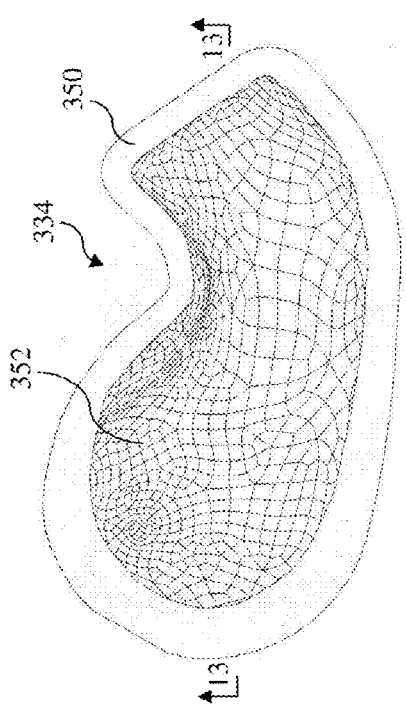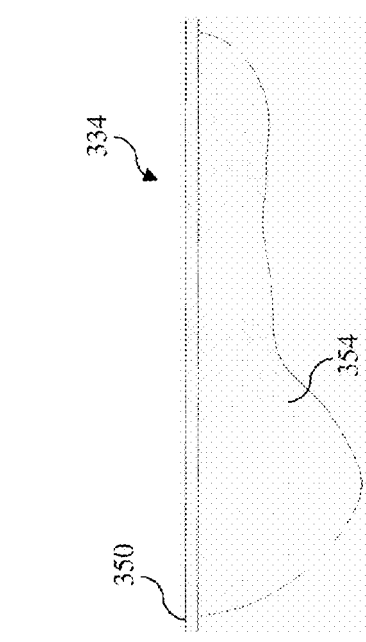
Fig. 13
Fig. 14
Fig. 11
Fig. 12

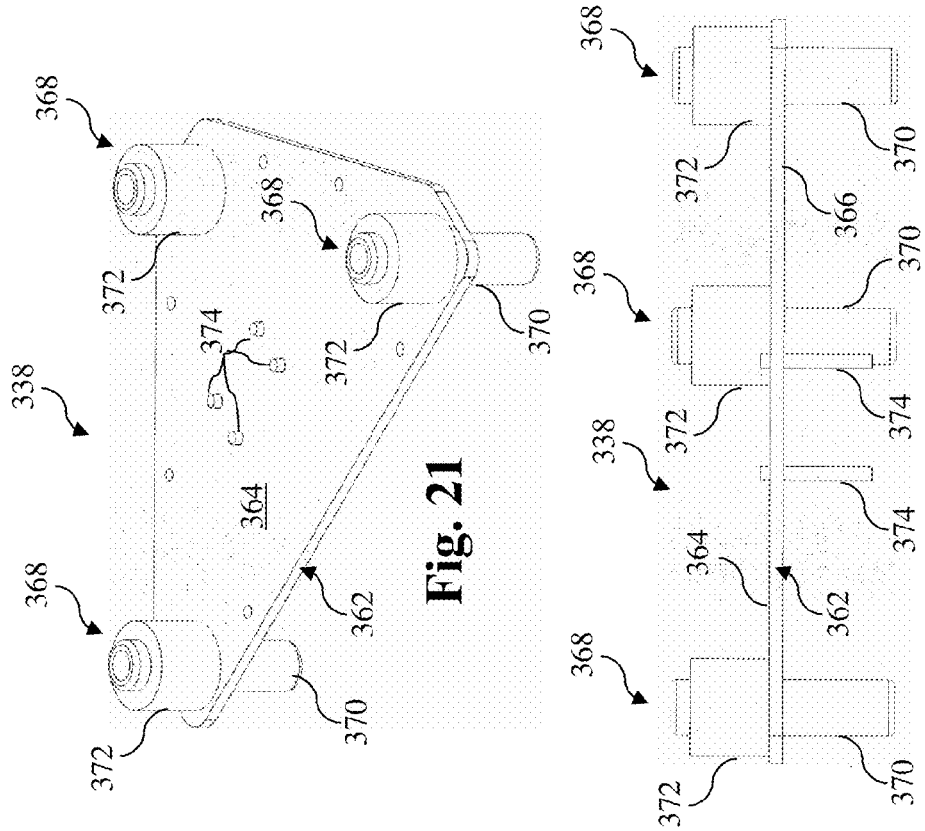
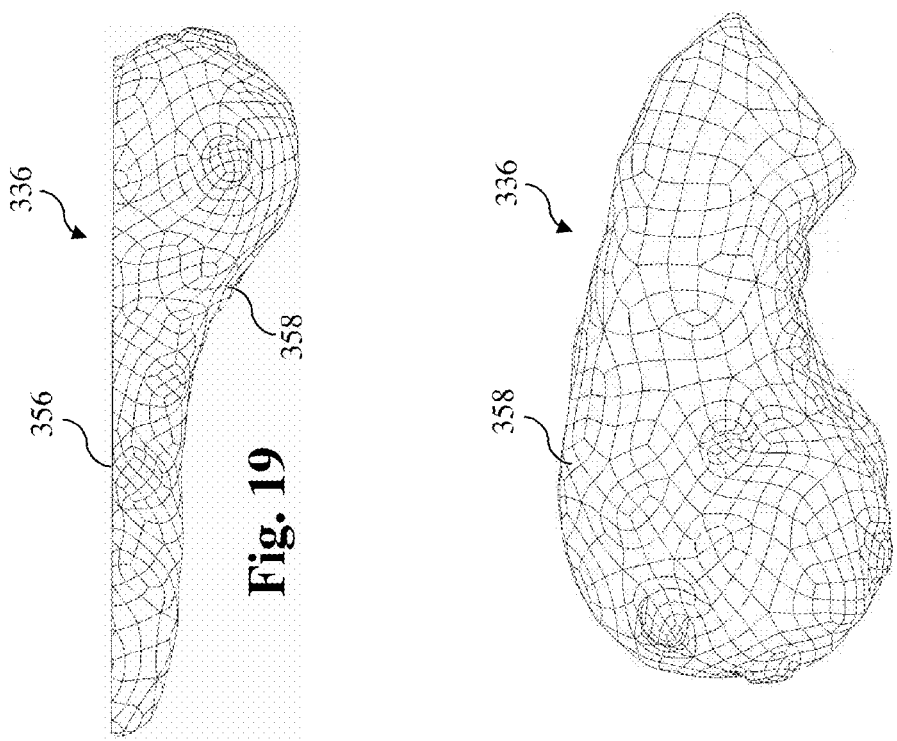
Fig. 21
Fig. 22
Fig. 19
Fig. 20

BREAST TISSUE MODELS, MATERIALS, AND METHODS

CROSS-REFERENCE TO RELATED APPLICATIONS

The present application is a non-provisional application that claims priority to U.S. Provisional Patent Application No. 61/305,982, filed Feb. 19, 2010 and titled "Polysiloxane Materials and Methods that Mimic Tissue," which is hereby incorporated by reference in its entirety. The present application is related to U.S. patent Ser. No. 13/031,087, filed Feb. 18, 2011 and titled "ULTRASOUND PHANTOM MODELS, MATERIALS, AND METHODS", which is hereby incorporated by reference in its entirety.

BACKGROUND

As medical science has progressed, it has become increasingly important to provide non-human interactive formats for teaching patient care. Non-human interactive devices and systems can be used to teach the skills needed to successfully identify and treat various patient conditions without putting actual patients at risk. Such training devices and systems can be used by medical personnel and medical students to learn the techniques required for proper patient care. The training devices and systems can also be used by patients to learn the proper way to perform self-examinations.

As the use of non-human interactive training formats has increased, the need for materials that simulate natural human tissue has also increased. There have been earlier attempts to mimic characteristics of natural human tissues. For example, U.S. Patent Application Publication No. 2008/0076099 discloses human tissue phantoms and associated methods of manufacturing that utilize two-component silicone gels covered by a nylon fabric. Also, U.S. Pat. No. 5,805,665, U.S. Pat. No. 4,277,367, U.S. Pat. No. 5,902,748, and U.S. Pat. No. 6,675,035 each disclose various materials intended to simulate imaging properties of human tissue for various types of imaging techniques. Further, U.S. Pat. No. 6,945,783 discloses a breast examination training system with inflatable nodules that simulate tumors within the breast tissue. While these earlier attempts at mimicking aspects of natural human tissue have been adequate in some respects, they have been inadequate in many respects. Accordingly, there remains a need for materials that better mimic natural human tissue. In that regard, the training of medical personnel and patients is greatly enhanced through the use of realistic hands-on training with devices and systems, such as those of the present disclosure, that better mimic characteristics of natural human tissue than previous materials.

Polysiloxanes are the most common and one of the most important organosilicon polymers used in polymer chemistry. The silanol, $SiO(Me)_2$, is the key functional group in the synthesis of these polymers. It is very important to understand the chemistry of the individual elements of the polymer as well as the behavior of the functional group in order to understand the characteristics of polysiloxane polymers.

Silicon is a Group 4 (IVA) element found in the periodic table beneath carbon, and it is, by far, the most abundant element in the Group 4 elements. Some of its characteristics are similar to carbon, but overall it can be seen as a completely different element. It makes up 27% of the earth's crust by mass, and it is second in abundance in the world (after oxygen). Silicon has semi-metallic properties, thus, it is important in the semiconductor industry with wide ranges of applications in computers and solar energy collection. It is very rare to find silicon by itself in nature; it is usually bound to oxygen as either $SiO_2$ or $SiO_4$. Silicon dioxide has many forms found in nature, the most common being quartz, a major constituent of sandstone and granite, as well as being a major component of glass.

Silicon bonding can be compared to carbon bonding in many ways. Carbon is the backbone of life and can form chains of infinite length. Silane, $SiH_4$, and methane, $CH_4$, are both very stable tetrahedral compounds. As you build chains, however, the carbon chain is stable but the silane chains' stability decreases with length. This is due to many factors: 1) the Si—Si bond is slightly weaker than the C—C bond, 2) the Si—H bond is weaker than the C—H bond, 3) silicon is less electronegative than hydrogen while carbon is more electronegative than hydrogen, and 4) silicon is larger, providing greater surface area, and has low lying d orbitals, which promotes nucleophilic attack.

Polysiloxanes are known for their useful properties, such as flexibility, permeability to gases, low glass transition temperature, $T_g$, and low surface energy. Polysiloxanes exhibit two types of flexibility: torsion flexibility and bending flexibility. Torsion flexibility is the ability of the atoms to rotate around a chemical bond. Bending flexibility occurs when there is a large hindrance between non-bonded atoms where there are unfavorable torsion angles.

In view of the foregoing, there remains a need for devices, systems, and methods appropriate for use in medical training that include materials that mimic natural human tissue.

SUMMARY

Devices, systems, and methods appropriate for use in mimicking natural human tissue are disclosed. Generally, the materials of the present disclosure are utilized to simulate natural tissue and, in particular, natural human tissue. In some instances, the materials of the present disclosure have particular application in the field of medical simulation. In some instances, the materials of the present disclosure provide a lifelike feel to simulated human skin and underlying tissue.

In one aspect a polysiloxane mixture for simulating human biological tissue is disclosed. The mixture comprises a silicone foam and a silicone oil, where the silicone foam and the silicone oil are combined in a manner such that the resulting mixture has physical material properties simulating a natural human biological tissue. In some instances, the silicone foam is present in an amount of about 10 to 45 percent by weight of the total mixture weight, while the silicone oil is present in an amount of about 55 to 90 percent by weight of the total mixture weight. In one particular instance, the silicone foam is present in an amount of about 25 percent by weight of the total mixture weight, while the silicone oil is present in an amount of amount of about 75 percent by weight of the total mixture weight. The silicone oil has a viscosity of about 30 to 500 centipoise in some embodiments. The silicon oil has a low molecular weight silicone oil in some embodiments. The silicone foam is a closed cell silicone foam in some embodiments. In some instances, the polysiloxane mixture further comprises a silicone thermoset. In some embodiments, the silicone foam and the silicone thermoset comprise a platinum catalyzed silicone. In some embodiments, the resulting polysiloxane mixture has physical material properties simulating the natural human biological tissue, including ultrasound properties such that ultrasound equipment typically used to visualize the natural human biological tissue can be used in a similar manner to visualize the resulting mixture. In some instances, the ultrasound materials of the present disclosure do not include a silicone foam.

In another aspect, a method of manufacturing a biological tissue phantom is disclosed. The method comprises mixing a silicone oil with a silicone foam to form a blend, pouring the blend into a mold, stirring the blend until a foaming reaction starts, and allowing the blend to cure. The cured blend has physical material properties simulating a natural human biological tissue and in some instances, human breast tissue. In some instances, the method includes adding a silicone thermoset to reduce and quantity of the foam cells. In some embodiments, the silicone foam is a two-component platinum silicone foam. In some embodiments, the silicone oil is a low molecular weight silicone oil. In some instances, the amount of silicone oil that is mixed is about three times the amount of the silicone foam.

In another aspect, a human breast tissue model is disclosed. The human breast tissue model comprises a simulated breast tissue comprising a mixture of a silicone foam and a silicone oil and a simulated skin layer covering the simulated breast tissue. The simulated skin layer comprises a silicone thermoset. The simulated breast tissue and the simulated skin layer are sized and shaped to mimic a natural human breast. In some instances, the human breast tissue model includes at least one simulated pathological structure imbedded within the simulated breast tissue. The at least one simulated pathological structure is formed of a material different than the simulated breast tissue. In some embodiments, at least one simulated pathological structure simulates a pathology selected from a group consisting of a cyst, a medullary carcinoma, a ductal carcinoma, an infiltrating scirrhus carcinoma, a lobular carcinoma, and a fibroadenoma. In some instances, the at least one simulated pathological structure is formed of a silicone thermoset. In one embodiment, the at least one simulated pathological structure is formed of a silicone thermostat having a shore hardness of about 10A. In some instances, the human breast tissue model includes at least one simulated anatomical structure imbedded within the simulated breast tissue at an anatomically appropriate location. In some embodiments, at least one simulated anatomical structure simulates an anatomical structure selected from a group consisting of a lymph node, a pectoralis muscle, and a rib. In some instances, the human breast tissue model includes a fastener attached to a portion of the human breast tissue model. In some embodiments, the fastener is configured to allow the human breast tissue model to be affixed to a base. In some instances, the base is a female torso or manikin.

BRIEF DESCRIPTION OF THE DRAWINGS

The present disclosure can be better understood from the following detailed description when read with the accompanying figures.

FIG. 3 is a perspective view of a pair of breast tissue models according to one aspect of the present disclosure.

FIG. 11 is a top view of the glove mold of FIG. 10.

FIG. 12 is a side view of the glove mold of FIGS. 10 and 11.

FIG. 13 is a cross-sectional side view of the glove mold of FIGS. 10-12, taken along section line 13-13 of FIG. 11.

FIG. 14 is a top view of the mother mold of FIGS. 7-9 and the glove mold of FIGS. 10-13 assembled together.

FIG. 19 is a side view of the insert mold of FIGS. 16-18 similar to that of FIG. 18, but showing the opposite side of the insert.

FIG. 20 is a bottom view of the insert mold of FIGS. 16-19.

FIG. 21 is a perspective view of a gantry of the molding system of FIG. 6.

FIG. 22 is a side view of the gantry of FIG. 21.

DETAILED DESCRIPTION OF PREFERRED EMBODIMENTS

Figure 2:
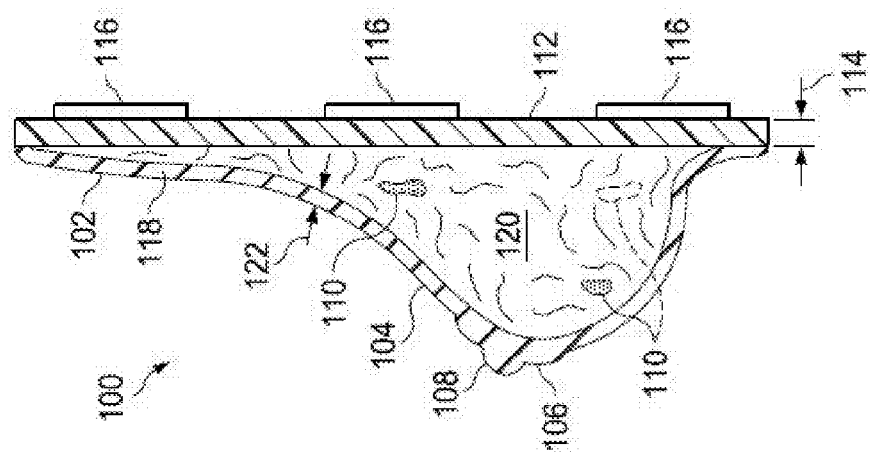
FIG. 2 is a cross-sectional side view of the breast tissue model of FIG. 1.

The present invention is directed to polysiloxane materials that have unique physical properties that mimic biological tissue, including very low flexural modulus (tendency for a material to bend), exceptional resilience (the power or ability to return to original form or position after being bent, compressed, or stretched; elasticity), and self sealing characteristics (ability to automatically seal punctures). Products that are properly constructed from these materials in accordance with the present disclosure provide properties that include the tactile properties, ultrasound properties, and resilient properties of biological tissue. The products formed from the inventive materials simulate real skin and tissue, and are resistant to deterioration, even after repeated puncture by needles and other medical instruments. The products formed from the inventive materials of the present disclosure can also advantageously mimic aspects of real medical procedures, e.g., natural closure of a puncture. The materials of the present disclosure provide lower flexural modulus with greater recovery than materials previously used to recreate the look and feel of biological tissue.

One purpose of the inventive materials and methods described herein is the production of simulators for use in medical procedure and examination technique training. Other uses contemplated, however, include any application that requires the feel and appearance of animal tissue, especially human tissue. Such applications include, without limitation, puppets, taxidermy, robotics, and sex toys.

The materials of the present invention include a mixture of at least two polysiloxane or silicone materials (1) a silicone foam or gel and (2) a silicone oil or fluid. The combination of the oil with the foam produces a material that feels and acts surprisingly similar to certain biological tissue. The present disclosure provides materials that mimic the feel of human tissue and provides materials that mimic the ultrasound properties of human tissue. A material formed of a silicone foam and a silicone oil or fluid produces a material that is very soft and flexible and mimics the feel of certain human tissues, such as the softness of a human breast. This material is not as useful as a matrix for ultrasound as other materials of the present disclosure due to the air encapsulated in the foam. However, the material is very useful as a target in ultrasound applications. For example, in some instances it is utilized as a target within a material formed of silicone gel, fused silica, and silicone fluid, which has excellent properties for use as an ultrasound matrix (as well as targets within the ultrasound matrix).

As used herein, the term "silicone foam" designates a polyorganosiloxane composition in the form of a foam. Silicone foam is produced by a condensation reaction between a siloxane polymer containing silanol (Si—OH) groups and crosslinkers containing silane (Si—H) groups, typically in the presence of a catalyst. When these compounds are mixed and reacted together, the formation of siloxane linkages (Si—O—Si) occurs, liberating hydrogen gas, which acts as the blowing agent to make the material into foam. Because of its high silicone content, silicone foam is typically less flammable than flexible polyurethane foam.

The foamable silicone compositions according to the present invention may be any of those which are commercially available that include an organosilicon polymer including siloxane units having a silicon-bonded hydrogen atom, a hydroxy bearing material, for example an organosilicon polymer including siloxane units providing silicon-bonded hydroxyl groups, and a catalyst, for example a tin compound or more preferably a noble metal compound or complex. These compositions cure according to the scheme OH+≡Si—H—>≡Si—O+H$_2$. A polymeric material reactive with the silicon-bonded hydrogen atoms, for example an organosilicon polymer having silicon-bonded hydroxyl and/or unsaturated e.g., vinyl groups, may be included in the mixture so that a network of interconnected polysiloxane chains is produced and the hydrogen evolved as a gas serves to form cells within the developing network. Preferred foam forming, curable organosilicone polymer compositions include a polydiorganosiloxane having silicon-bonded unsaturated, e.g., vinyl groups, available for reaction with polysiloxanes having silicon-bonded hydrogen atoms. The addition reaction that occurs is appropriate to yield chain extended or crosslinked elastomeric silicone products, but does not generate volatile materials for causing foaming in the curing composition. The foaming may be achieved by chemical reaction of the silicon-bonded hydrogen atoms with silicon-bonded hydroxyl groups and/or water or an aliphatic alcohol, or by inclusion in the composition of a volatile blowing agent. The polysiloxanes and other ingredients and the proportions thereof are selected so that the network is sufficiently developed and cured to produce a resilient foam of desired cellular structure within a short period of time, on the order of a few minutes or less.

Suitable polysiloxanes include siloxane units having a silicon-bonded hydrogen atom include polysiloxanes having units according to the general formula $$R_pHSiO_{(3-p)/2}$$

in which each R represents a monovalent hydrocarbon group containing 1 to 20 carbon atoms, for example a lower alkyl or phenyl group, e.g., a methyl group, and p is 1 or 2. The polysiloxanes may also comprise units (i)

$$R_nSiO_{(4-n)/2}$$

in which R is as referred to above and n is 1, 2 or 3. Preferably, the polysiloxane has from 0.3% to 2.5% by weight of silicon-bonded hydrogen atoms. Each R preferably represents a methyl group. Preferably, terminal groups of the polysiloxane have the formula $R_3SiO_{1/2}$, where each R represents a methyl group. Suitable polysiloxanes include those comprising MeHSiO units with or without the presence of Me$_2$SiO (where Me represents a methyl group) units and having viscosities on the order of from about 1 to about 1000 mm$^2$/s, more preferably from about 5 to about 50 mm$^2$/s.

Suitable polysiloxanes having silicon-bonded unsaturated, e.g., vinyl groups available for reaction with polydiorganosiloxanes having silicon-bonded hydrogen atoms include polysiloxanes having siloxane units according to the general formula $$R_mR'SiO_{(3-m)/2}$$

in which each R represents a monovalent hydrocarbon group having up to 20 carbon atoms, for example a lower alkyl or phenyl group, e.g., a methyl radical, m is 1 or 2 and R' represents an aliphatically unsaturated group for example cyclohexenyl or a group CH=CHR" linked to the silicon atom, for example via a divalent aliphatic chain wherein R" represents a hydrogen atom or an alkyl group for example vinyl, allyl or hexenyl. These polysiloxanes also comprise units (i) in which R and n are as referred to above. These materials are reactive with the silicon-bonded hydrogen atoms in presence of a noble metal catalyst by a hydrosilylation reaction and thus contribute to the polysiloxane matrix. Preferably these polysiloxanes have from 0.0002% to 3% by weight of aliphatically unsaturated groups and n is such that they have a viscosity on the order of about 10 mm$^2$/s to about 500,000 mm$^2$/s. Preferred compositions employ a polysiloxane having siloxane units according to the general formula $$R_mR'SiO_{(3-m)/2}$$

in which R' represents a group CH=CH$_2$ linked to the silicon atom via a divalent aliphatic chain and having a viscosity in the range 100 mm$^2$/s to 2000 mm$^2$/s.

Suitable organosilicon polymers including siloxane units providing a silicon-bonded hydroxyl group include polydiorganosiloxanes having at least two siloxane units of the formula $$R_aQ_bSiO_{(4-(a+b))/2}$$

in which a has a value of 0, 1 or 2, b has a value of 1 or 2 and the sum of a+b is not greater than 3, Q represents a hydroxyl group for example silanol terminated polydiorganosiloxanes according to the general formula HO((R$_2$)SiO)$_5$H in which each R represents a methyl group and has a value from about 10 to about 1200. Suitable materials have viscosities on the order of about 10 mm$^2$/s to about 500,000 mm$^2$/s. Preferred compositions which provide the more elastomeric foams employ polydiorganosiloxanes according to the general formula HO((R$_2$)SiO)$_x$H as aforesaid which have viscosities on the order of about 2,500 mm$^2$/s to about 20,500 mm$^2$/s. The density of the silicone foam can be significantly reduced without degrading its structural strength by including a short-chain silanol terminated polydiorganosiloxane in the formulation. Preferred compositions employ polydiorganosiloxanes according to the general formula HO((R$_2$)SiO)$_x$H as aforesaid in which s has a value from about 2 to about 10. Preferred materials have viscosities on the order of about 5 mm$^2$/s to about 100 mm$^2$/s.

Polydiorganosiloxanes having at least two siloxane units of the formula $$R_a Q_b SiO_{(4-(a+b))/2}$$

in which Q is a hydroxyl bearing alkylene or oxyalkylene chain may also be used. The chain may be attached to the silicon atom in any convenient way but is preferably linked to the silicon atom by a carbon atom. Suitable hydroxyl bearing chains include those containing up to 50 chain atoms. Suitable alkylene chains are those having 1 to 15, more preferably 4 to 10 chain carbon atoms. Suitable oxyalkylene chains include those of the formula (C$_d$H$_{2d}$O)$_e$H in which d has the value 2, 3 or 4 and e has a value in the range of 1 to 15 and more preferably in the range of 1 to 10, i.e., having from 1 to 15 and, more preferably, 1 to 10 oxyalkylene groups. The oxyalkylene groups may be for example oxyethylene, oxypropylene or oxybutylene or mixtures thereof, the most preferred being the oxyethylene group. This polydiorganosiloxane also comprises siloxane units (i) as aforesaid. Other materials that may be included as crosslinking agents include materials having three or more functional e.g., hydroxy groups per molecule.

The foam compositions for use in the present invention preferably include one or more alcohols. These materials influence the structure of the foams formed by use of the composition and yield cured foams of low density. The alcohol is selected with a view to contributing not only to the generation of hydrogen gas, but also with a view to achieving desired resilience of the foam. Suitable alcohols include the primary aliphatic and araliphatic alcohols for example the lower aliphatic mono functional alcohols having up to 8 carbon atoms, e.g., ethanol, propanol, butanol and benzyl alcohol. Foams of lowest density are formed by use of the aliphatic alcohols having from 2 to 12 chain carbon atoms. Preferred compositions employ n-propanol.

Compositions suitable for use in the invention also preferably employ a foam stabiliser or surfactant. Suitable foam stabilising materials include fluorinated silicones, for example a polyorganosiloxane comprising $$(CF_2)_m(CH_2)_nO_pSiO_{(4-p)'/2}$$

R$_3$SiO$_{1/2}$, SiO$_{4/2}$ units and silicon bonded hydroxyl groups wherein each R represents a monovalent hydrocarbon group containing from 1 to 20 carbon atoms, m is an integer having an average value of from 1 to 20, n has the value 1 or 2, p has the value 1, 2, or 3. The polysiloxane may also include from 0 to 10 percent, based on the weight of said polyorganosiloxane, of GSiO$_{3/2}$ units wherein G represents the residue obtained by removing the hydrogen atom from a hydroxyl group of a linear organic polymer selected from the group consisting of homopolymers of ethylenically unsaturated alcohols, copolymers of these alcohols with ethylenically unsaturated hydrocarbons, polyethers and polyoxyalkylene glycols, wherein said organic polymer contains an average of at least one terminal hydroxyl group per molecule. These materials may be prepared by treatment of hexamethyldisiloxane coated polysilicates with the alcohol F(CF$_2$)$_8$CH$_2$CH$_2$OH. They serve to stabilize the structure of the foam during its curing.

Suitable noble metal catalysts for use in the foamable compositions include rhodium and platinum containing materials. Platinum catalysts may take any of the known forms, ranging from platinum as deposited on carriers such as silica gel or powdered charcoal to platinic chloride, salts of platinum and chloroplatinic acids. A preferred form of platinum is chloroplatinic acid either as the commonly obtainable hexahydrate or the anhydrous form, on account of its easy dispersibility in organosilicon systems and its non-effect on color of the mixture. Platinum complexes may also be used, e.g., those prepared from chloroplatinic acid hexahydrate and divinyl tetramethyldisiloxane. Compositions according to the invention foam and cure very rapidly when the component parts have been mixed together. If it is desired to prolong the cure time, for example if it is desired to mix the composition and then transfer it to the site where it is intended to foam and cure, one may include in the composition one of the known platinum catalyst inhibitors such as a polymethylvinylsiloxane cyclic compound or an acetylenic alcohol, e.g., methyl butynol. Larger proportions of catalyst may be used when a faster cure is desired.

There are no special limitations with regard to the types of silicone oil used in the present invention. The silicone oil generally has a viscosity between about 50 cps and about 400 cps. The silicone oil may have a completely linear, partially-branched linear, cyclic, or a branched-chain molecular structure. The most preferable is a linear or a cyclic molecular structure, with a low molecular weight. For example, the silicone oil can be a dimethylpolysiloxane having both molecular terminals capped with trimethylsiloxy groups, a methylphenylpolysiloxane having both molecular terminals capped with trimethylsiloxy groups, a copolymer of methylphenylsiloxane and dimethylsiloxane having both molecular terminals capped with trimethylsiloxy groups, a copolymer of methyl (3,3,3-trifluoropropyl) siloxane and dimethylsiloxane having both molecular terminals capped with trimethylsiloxy groups, a cyclic dimethylsiloxane, or a cyclic methylphenylsiloxane. For example, the silicone oil can be an oil similar to those mentioned above, such as, a dimethylpolysiloxane having both molecular terminals capped with dimethylvinylsiloxy groups, a copolymer of methylvinylsiloxane and dimethylsiloxane having both molecular terminals capped with dimethylvinylsiloxy groups, a methylvinylpolysiloxane having both molecular terminals capped with trimethylsiloxy groups, or a cyclic methylvinylsiloxane. It is preferred that the silicone oil have a viscosity of 1 to 100,000,000 centipoise, preferably 2 to 10,000,000 centipoise, more preferably 25 to 1,000 centipoise, and most preferably 50 to 300 centipoise at 25° C. Preferred examples of silicone oil are polydimethylsiloxane and simethicone.

In an exemplary embodiment, the silicone mixture includes a silicone closed cell foam blended with a low molecular weight silicone oil. The addition of the low molecular weight silicone oil to the closed cell silicone foam produces a material with exceptional low modulus, i.e., very flexible in a manner that is similar to natural human tissue. This mixture of silicone materials also provides a product that has a recoil similar to human tissue.

To make the silicone mixture, typically one part silicone foam (e.g., Smooth-On Soma Foama® 15 and three parts silicone oil (e.g., BJB Enterprises TC-5005-C or SilPak F-100 is prepared. The silicone oil is first mixed with part A of the foam. In some embodiments, the silicone foam cell structure produces a specific gravity of 0.15 to 0.30 g/cm$^3$, processing with the silicone oil. This mixture is then blended with part B of the foam until thoroughly mixed. The resulting blend is then poured into a mold cavity or the product cavity and is stirred until the foaming reaction starts. The stirring is discontinued.

In some applications, a third component, such as a soft silicone thermoset is added. Generally, the silicone thermoset has a low durometer hardness, which is between about 0010 and about 0040 in some instances. In some embodiments, Smoothon Ecoflex 0010 is utilized. The addition of the silicone thermoset reduces the quantity of foam cells present. In some instances, when the resulting product is to be an ultrasonic phantom, the foam can be eliminated by use of a soft silicone thermoset if the desired physical properties of the foam are not needed.

The materials of the present disclosure have similar ultrasonic properties to natural human tissue such that ultrasound machines and equipment typically used for examining natural human tissue may similarly be used to examine the materials of the present disclosure. In some instances, the tissue-mimicking material for use in ultrasound has the same range of speeds of sound, attenuation coefficients, and backscatter coefficients as the corresponding natural human tissue. Speeds of sound in human soft tissues is thought to vary over a fairly small range with an average value of about 1540 m/s, while the speed of sound in fat is thought to be about 1470 m/s. The amplitude attenuation coefficients in these tissues appear to vary over the range from about 0.4 dB/cm to about 2 dB/cm at a frequency of 1 MHz.

Ultrasound phantoms are used to train medical personnel and to calibrate ultrasound equipment. The phantom consists of targets imbedded in a matrix material. The targets are used to mimic features of the body such as abnormal tissue, blood vessels and bone. The matrix may have several layers that mimic the layers of tissue and fluids of the body. Medical ultrasound evaluations have recently employed techniques that determine the flexibility of targets. This advancing technology is used to distinguish benign growths from cancerous tumors.

Mixtures of unfilled silicone gels (i.e., where silicone gel is understood to contain only siloxane and no fillers such as fused silica or silicone oils) will successfully transmit ultrasound waves of common frequencies used in medical practices. The depth of penetration is greater than 10 cm and much greater when the proper ultrasound frequencies are applied. The materials are tough, have high elongation (100% to 1000% at break) and can be made with a wide range of flexibilities. Silicone gels and silicones filled with silicone liquids and fused silicones can be obtained from Factor II, AZ. An example of an unfilled silicone gel is Factor II A-341. An example of a filled silicone is Factor II LSR-05. These materials are suitable for use as ultrasound matrix and targets. In that regard, in some instances a silicone gel comprises 20-75% of the mixture, fused silica comprises 0-50% of the mixture, and silicone fluid comprises 0-50% of the mixture.

The reflectivity of silicone targets can be adjusted to simulate various types of human tissues and abnormalities. Silicone targets can be varied to create images that mimic soft to rigid tissues. The density and flexibility of silicone targets, and the corresponding reflectivity of the targets when visualized using ultrasound, is selectable by changing the corresponding ratio of silicone gel, fused silica, and silicone oils. Changing the bulk modulus and/or density (vs. the matrix) determines the strength of the echo. The greater this difference the greater the reflection. The density of unfilled silicone thermosets (containing silicone gel, fused silica, and silicone oil) can vary from approximately a specific gravity of 0.9 to 1.5 g/cc. In one embodiment, the matrix material is formed of a Shore 0010 silicone and two targets are positioned within the matrix material. The first target is formed of Shore 30A silicone (silicone gel and fused silica) and the second target is formed of Shore 0030 silicone (silicone gel, fused silica and silicone oil). The two targets reflect differently under ultrasound. The 30A target will have greater reflection than the 0030 silicone target. The silicone gel/fused silica/silicone oil offers a wide range of bulk modulus/density to facilitate a wide range of reflection strengths relative to a corresponding matrix material.

Targets can also be used within the silicone matrixes that do not contain silicone. Examples of such targets are spaces within the matrix that contain air, water, and/or saline solutions. In some instances, fluid filled spaces within the silicone matrix material are utilized to represent blood vessels and/or other fluid filled organs of the body such as cysts. Additional examples of non-silicone targets include thermoplastics and thermosets. The range of thermoplastics that can be used is almost unlimited: some examples are nylons, polyethylene, polyesters, styrene-ethylene-butylene-styrene and polyurethane. Thermosets include polyurethanes, latex, polysulfide, and various epoxies. Silicone foams, such as those described herein, are used as targets in some instances. The foam can be used with or without silicone fluids and silicone thermosets. These closed cell foams are used to represent highly reflective tissue such as bone and gas filled organs, in some instances.

Utilizing silicone materials as the matrix and targets of an ultrasound phantom as described by the present disclosure are modifiable for use in a wide variety of ultrasound applications. In that regard, a greater range of reflection from the targets can be produced with non-filled silicones than filled thermoplastics. The targets can be made to realistically mimic a broad range of tissues and abnormalities without the need for non-silicone fillers. In some instances, increased reflectivity is achieved by not applying a vacuum to the silicone during production. In that regard, by not applying a vacuum to the silicone, the resulting targets will contain small pockets of air that increase the reflectivity under ultrasound examination. Further, the silicone targets of the present disclosure are also suitable for use within a matrix of other polymers such as thermoplastics.

A construction of silicone mixtures as layers and targets has advantages over non-silicones and neat silicone gels. The silicone mixtures of the present disclosure, when properly formulated and cured, will bond to properly formulated silicone targets or layers without adhesives. This allows the model to be layered without air gaps that can interfere with the ultrasound imaging. In that regard, construction of phantoms is accomplished in some instances by constructing a base layer of silicone matrix and then positioning targets on the layer then covering with the targets and base layer with another layer of silicone matrix. This method of construction facilitates the exact positioning of the targets within the phantom and results in the targets being bonded to the matrix, while preventing the formation of a layer of air around the targets. Further, the filled silicone matrix of the present disclosure is significantly more durable than neat silicone gels.

In some instances, the inventive silicone mixtures of the present disclosure are used to manufacture biological tissue phantoms to train medical professionals and/or the general public.

Figure 1:
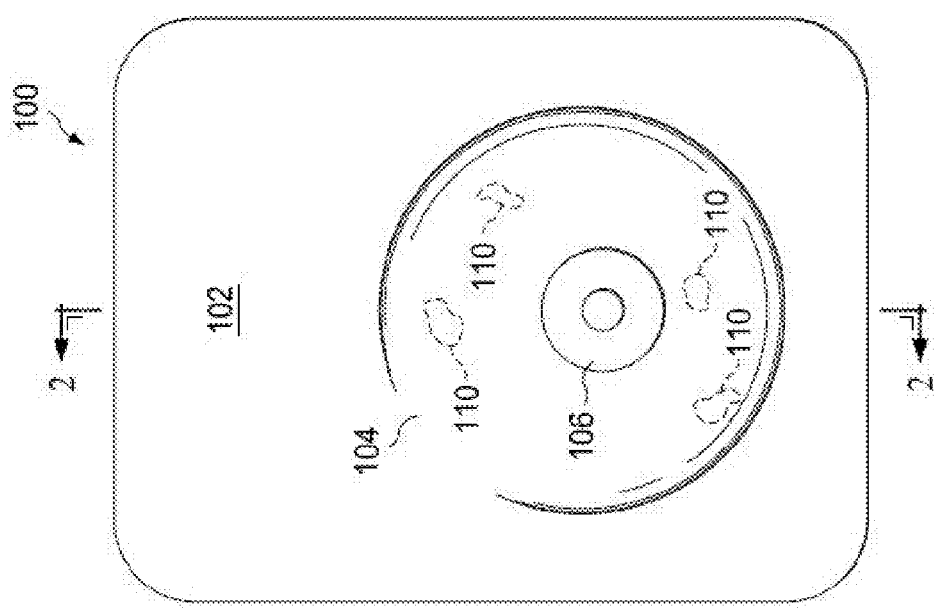
FIG. 1 is a front view of a breast tissue model according to one aspect of the present disclosure.

In one embodiment, the mixtures are manufactured into tissue models for breast self examination. For example, referring now to FIGS. 1 and 2, shown therein is a breast tissue model 100 according to one aspect of the present disclosure. In that regard, FIG. 1 is a front view of the breast tissue model 100, while FIG. 2 is a cross-sectional side view of the breast tissue model.

As shown in FIG. 1, the breast tissue model 100 includes a foundation 102 from which a breast 104 extends. In that regard, the breast 104 is sized and shaped to simulate a natural human breast. Accordingly, the breast 104 will have different sizes and shapes in various embodiments. Specifically, the breast 104 may be sized and shaped to represent natural human breasts of varying cup size, age, medical condition, and other aspects. In some instances, the foundation 102 is sized and shaped to simulate the anatomy surrounding the natural human breast. The breast 104 includes an areola 106 and a nipple 108. The areola 106 and the nipple 108 are similarly sized and shaped to simulate a natural human areola and nipple. Accordingly, the areola 106 and/or the nipple 108 will have different sizes and shapes in various embodiments. Within the breast tissue model 100 are a plurality of simulated pathologies 110, which are illustrated in phantom. Generally, the pathologies 110 are sized, shaped, and have material properties to mimic various cysts, lumps, fibrous tissue, and other features found in natural breast tissue. In some instances, the pathologies mimic one or more of cysts, lumps, medullary carcinomas, ductal carcinomas, infiltrating scirrhus carcinomas, lobular carcinomas, and fibroadenomas. While illustrated as being within the breast 104, in other embodiments one or more pathologies are present in the foundation 102 of the breast tissue model 100 as well.

Referring more particularly to FIG. 2, the breast tissue model 100 includes a backing 112 that supports the foundation 102 and the breast 104. In the illustrated embodiment, the backing 112 is substantially planar with a substantially constant thickness 114. It is understood, however, that the size and shape of the backing 112 as well as the size or footprint of the foundation 102 may be varied. In some instances, the backing 112 and the foundation 102 are sized and shaped for positioning onto a base. Accordingly, in such instances, the backing 112 and foundation 102 are sized and shaped to match an area of the base that will receive the breast tissue model 100. In some instances, the backing 112 and/or the foundation 102 is contoured to accommodate for the shape of the base such that when the breast tissue model 100 is positioned on the base, the foundation 102 and the breast 104 together substantially simulate a natural human breast and the surrounding tissue. In that regard, in some embodiments the backing 112 and/or the foundation 102 is contoured to match the shape of a manikin or torso onto which the breast tissue model 100 will be mounted. Accordingly, it is understood that in some embodiments the thickness 114 of the backing 112 varies across the backing. It is also understood that the thickness 114 of the backing may vary greatly depending on an intended application for the breast tissue model 100.

In some instances, the manikin or torso includes a recess sized and shaped for receiving the breast tissue model 100. In one such embodiment, an inner surface defined by the recess of the manikin or torso is configured to mate with backing 112. As shown in FIG. 2, the backing 112 includes a plurality of fasteners 116 extending therefrom. Releasable fasteners, such as hook and loop, snaps, buttons, ties, or any other suitable fastening device, may be used to selectively attach the breast tissue model 100 to a base, including a manikin or torso. The fasteners 116 are bonded to the breast tissue model 100 with an adhesive in some instances. In some instances, the adhesive is a cyanoacrylate and primer suitable for use on a silicon thermoset. Such adhesives are currently available from Loctite® Corporation. In other instances, the breast tissue model 100 is molded or formed as part of the base (e.g., as part of a female torso or manikin) and is, therefore, permanently attached to the base.

As shown in FIG. 2, the breast tissue model 100 includes a skin layer 118 surrounding a fat or tissue layer 120. The skin layer 118 is formed of a silicone thermoset. Preferably, the silicone thermoset has a softness and resiliency similar to natural human skin and has a shore hardness of equal to or lesser than 0010. One example of a suitable silicone thermoset is Smooth-On Ecoflex® 0010. As shown, the skin layer 118 has a thickness 122. In the illustrated embodiment, the thickness 122 of the skin layer 118 is substantially constant across a majority of the breast tissue model 100. Generally, the thickness 122 of the skin layer 118 is between about 1.0 mm and about 8.0 mm, and in some instances is between about 2.0 mm and about 6.0 mm. The particular thickness of the skin may be selected in order to appropriately simulate particular skin types and/or skin locations. As shown, however, an increase in the thickness of the skin layer 118 is utilized to define the areola 106 and the nipple 108. In other instances, the thickness 122 of the skin layer 118 varies across the breast tissue model 100 in areas other than the areola 106 and nipple 108. In some embodiments, the backing 112 is formed of the same material as the skin layer 118. Colorant is added to the silicone thermoset of the skin layer 118 in order to simulate the natural colors of the skin, areola, and nipple. Also, adding colorant to the skin 118, areola 106, and nipple 108 of the breast tissue model 100 prevents a user from being able to visualize the underlying pathologies 110 within the breast tissue model. In that regard, the particular colorant added to simulate the skin, areola, and nipple colors is selected to a match that of a particular ethnic group in some instances. Generally, the skin, areola, and nipple colors of the breast tissue model 100 may be selected to match the corresponding natural skin, areola, and nipple colors of any ethnic group around the world.

The tissue layer 120 of the breast tissue model is formed from a mixture of silicone foam and silicone oil. Generally, the silicone foam is present in amount between about 10 percent and about 45 percent by weight of the total mixture weight, and the silicone oil is present in an amount between about 55 percent and about 90 percent by weight of the total mixture weight. In one particular embodiment, the mixture is comprised of one part (or about 25 percent by weight) silicone foam, e.g., Smooth-On Soma-Foama® 15, and three parts (or about 75 percent by weight) silicone oil, e.g., BJB Enterprises TC-5005-C. The pathologies 110 at the interface between tissue layer 120 and skin layer 122 are formed from a silicone thermoset. In some instances, the pathologies 110 are formed from a silicone thermoset having a shore hardness of about 10A. An example of a suitable silicone thermoset for forming at least some of the pathologies 110 is Smooth-On Dragon Skin®. The silicon thermoset utilized for a particular pathology is dependent on the characteristics of the pathology that is to be simulated. Accordingly, it is understood that various silicon thermosets having different properties may be utilized within a breast tissue model 100 in order to simulate different pathologies.

The model 100 provides a means for teaching the techniques of breast examination to detect breast abnormalities.

In that regard, in some instances the breast tissue model is particularly well suited for teaching proper techniques for detecting pathologies (e.g., cysts or lumps, including medullary carcinomas, ductal carcinomas, infiltrating scirrhus carcinomas, lobular carcinomas, and fibroadenomas) in the breast with one's hands. In some instances, the model 100 is used to teach the spiral or grid patterns of palpation of the breast. In this manner, the model 100 serves as an educational tool that can be used to teach users how to identify the signs and symptoms of breast cancer and other medical conditions. Through proper training with the devices of the present disclosure, earlier detection of breast cancer can be facilitated.

In some instances, a life size model of a human breast, typically with one or more lumps embedded in therein, is provided. In some instances, the breast tissue model is attachable to an upper part of a simulated female torso or to a full size manikin to better simulate an actual examination. In some instances, each breast includes a fastener or connector that allows the breast to be selectively attached and detached from the torso. Such detachable breasts allow for the use of breasts with different characteristics (e.g., number, size, and/or location of lumps) on the torso in order to better train users. In other instances, the breast tissue model is molded or formed as part of the female torso or manikin and is, therefore, permanently attached to the torso. During the examination, the torso to which the model is attached may be in vertical, horizontal, or reclined position. The model of the human breast and the torso or manikin, are easily shipped and readily transportable.

Referring now to FIG. 3, shown therein is a breast tissue model system 150 according to one aspect of the present disclosure. The breast tissue model system 150 includes a breast tissue model 152 and a breast tissue model 154. The breast tissue model 152 is substantially similar to the breast tissue model 100 described above. In that regard, the breast tissue model 152 includes a foundation 156, a breast 158, an areola 160, a nipple 162, and pathologies 164 and 166. The structure of the breast tissue model 154 is substantially similar to the structure of the breast tissue model 152, such that the breast tissue model includes a foundation 168, a breast 170, an areola 172, a nipple 174, and pathologies 176 and 178 having substantially the same arrangement as the foundation 156, breast 158, areola 160, nipple 162, and pathologies 164 and 166. However, the breast tissue model 154 is formed without adding colorant to the skin such that the pathologies 176, 178 are visible through the skin. In that regard, the breast tissue model 154 is translucent such that the pathologies 176, 178 positioned within the breast 170 are visible to a user through the skin of the breast tissue model. To facilitate visual identification of the pathologies 176, 178, in some embodiments colorant is added to the materials forming the pathologies 176, 178 such that the pathologies 176, 178 contrast the surrounding tissue material. As the breast tissue model 154 has the same structure as the breast tissue model 152, the breast tissue model 154 can be used to show users where the various pathologies within the breast tissue model 152 are located and should have been detected. The breast tissue models 152, 154 may be provided together as a set such that the breast tissue model 152 may be considered the test model and the breast tissue model 154 the corresponding key or answer model. In some instances, the breast tissue models 152, 154 are provided as a pair of breasts, i.e., a left breast and a right breast. A specific example of the manufacturing of an embodiment similar to that shown in FIG. 3 is described below in the Examples section.

To manufacture a breast tissue model in accordance with the present disclosure, a mold is first made. As discussed above, different breast sizes for different stages of life (ages) as well as shapes can be manufactured. The mold generally defines the outside surface of the resulting breast tissue model. An initial model or master model that will serve as the basis for the mold can be sculpted, computer generated, or reproduced from a live model. After the initial model is made, a one piece silicone glove mold is made based upon the initial model. The glove mold is subsequently utilized to produce corresponding breast tissue models. The glove mold may be formed from any suitable materials. In some instances, a silicone thermoset with a hardness greater than or equal to 20A is utilized as the glove mold. Examples of suitable glove mold materials include Smooth On Rebound® 25. By utilizing a glove mold, the resulting product will not have a parting line. Also, the glove mold can be removed gently from the resulting product, thereby limiting any potential damage to the breast tissue model caused during removal from the mold. In some instances, a mother mold is utilized to surround and support the glove mold. The mother mold can be made of any suitable thermoset material. In one embodiment, the mother mold is formed of a hard polyurethane filled with aluminum particles. In one embodiment, the mother mold is formed of Smooth On C-1508®.

In some instances, the mother mold is manufactured in an alignment box. Once the alignment box is assembled, a shim is positioned and contoured over the glove mold. Clay openings are made between the shim and the glove mold. Polyurethane plastic, e.g., Smooth On C-1508®, is poured into half of the alignment box, and the shim is removed. Mold release is applied to the plastic. A second pour of polyurethane plastic is made and poured into the other half of the alignment box. The bottom of the alignment box is removed, and the alignment box split.

In some instances, an insert is also produced to help locate the lumps in the model, and to provide a cavity to pour the silicone mixture into. To produce the insert, the glove mold is mounted in the mother mold. A layer of clay is then sculpted on the interior of the glove mold. The thickness of the clay layer defines the skin in the final breast tissue model. The clay is then marked at the positions that the lumps will be located. The cavity is filled with a material to make the insert. The material used to make the insert should be selected so the skin material will not stick and allow easy removal of the insert during production. In some instances, a hard polyurethane with aluminum particles or aluminum with Nedox® coating is utilized. Reference for alignment between the insert and mother mold can be made at this time.

Figure 4A:
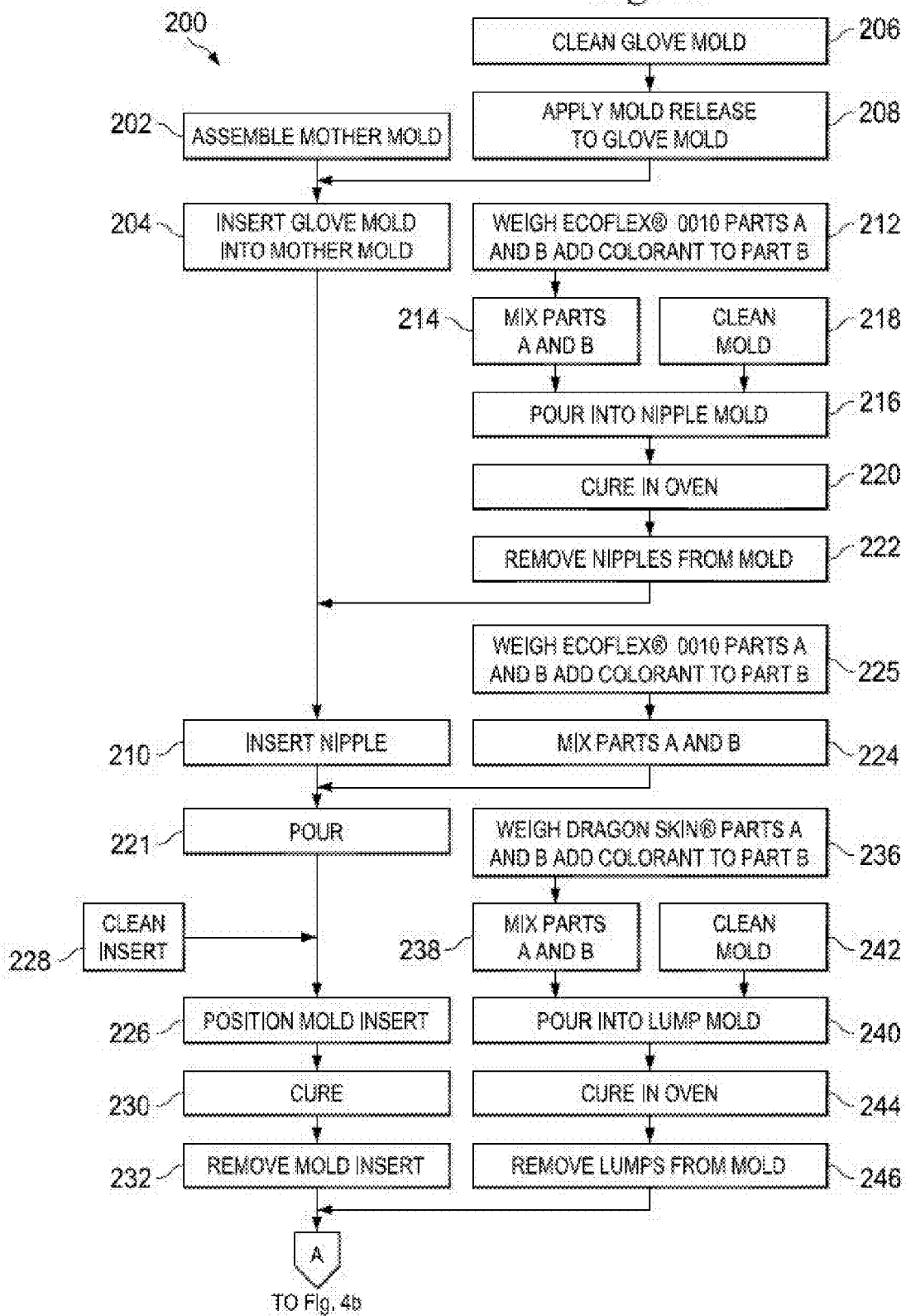
FIGS. 4a and 4b, combined, are a flow diagram of a method for manufacturing a breast tissue model according to the present invention.
Figure 4B:
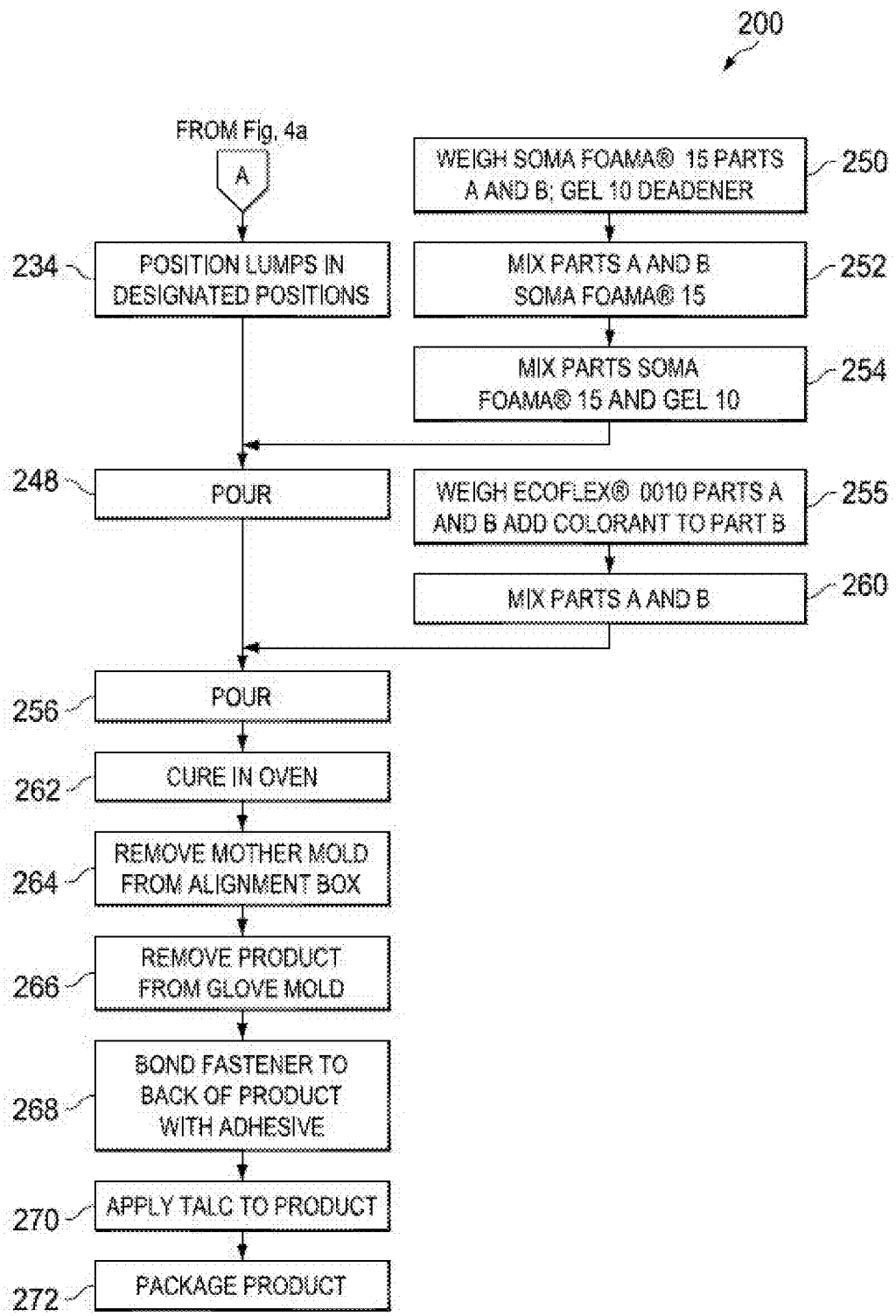

Referring now to FIGS. 4a and 4b, shown therein is a flow chart that illustrates a method 200 of producing a breast tissue model, such as those described above, according to one embodiment of the present disclosure. First, the mother mold is assembled within an alignment box at step 202. Then, the glove mold is inserted into the mother mold at step 204. In some embodiments, prior to insertion of the glove mold into the mother mold at step 204, the glove mold is cleaned at step 206 and/or mold release is applied to the glove mold at step 208. The nipple and/or areola is inserted into the glove mold at step 210. In some instances, the material for forming the nipple and/or areola is positioned in the glove mold and includes a colorant that contrasts with the rest of the breast to increase realism. For example, a small amount of the silicone mixture may be set aside, and a colorant may be added. This nipple/areola silicone mixture may be poured carefully into the glove mold into the area shaped to simulate the nipple and/or areola. In some instances, the silicone mixture for the nipple and/or areola is allowed to set or at least partially set before proceeding any further.

In some instances, the nipple and/or areola can be produced in a separate nipple and/or areola mold. In one particular embodiment, the nipple and/or areola are formed from Smooth-On Ecoflex® 0010. In that regard, at step 212 parts A and B of Ecoflex® 0010 for the nipple and/or areola are weighed. Optionally, a colorant is added to part B when weighing the parts. At step 214, parts A and B mixed. The mixture is then poured into a nipple and/or areola mold at step 216. In that regard, if necessary, the nipple and/or areola mold is cleaned at step 218. The mixture is cured in an oven at a temperature between about 3° C. and about 15° C. at step 220. In some instances, the curing temperature is between about 6° C. and about 9° C. Once the mixture has cured, the nipple and/or areola is removed from the mold at step 222. The resulting nipple and/or areola is then inserted into the glove mold at step 210.

At step 220, the material for producing the skin of the breast tissue model is poured into the glove mold. In that regard, the amount of material needed to produce the skin is then readied at steps 222 and 224. In one embodiment, at step 222 parts A and B of a suitable material, e.g., Ecoflex® 0010 are weighed. Optionally, a colorant is added to part B when weighing the parts. At step 224, parts A and B mixed. The skin material mixture is poured into the glove mold at step 220. To enhance the natural feel of the skin of the resulting breast tissue model, the thickness of the skin is between about 5 mm and about 7 mm in some embodiments. In one particular embodiment, the thickness of the skin is about 6.4 mm.

The method 200 continues at step 226 where the mold insert is positioned within the glove mold. In some instances, the insert is cleaned at step 228 prior to being positioned within the glove mold. In some instances, the mold insert defines marks or indentions in the skin material that correspond to the positions where at least some of the pathologies of the breast tissue model will be located. In that regard, the mold insert defines an inner surface of the skin material in some embodiments. With the insert positioned within the glove mold, the skin material is cured at step 230. In some embodiments, the skin material is cured by heating. The skin material is cured at a temperature between about 3° C. and about 15° C. and, in some instances, is cured at a temperature between about 6° C. and about 9° C. In some instances, heater blocks in the insert are utilized to cure the skin material. Once the skin material is cured, the insert is removed at step 234.

The method 200 continues at step 234 where the lumps of materials for simulating the various pathologies are inserted into the designated positions defined by the cured skin. In some embodiments, the lumps are made separately and inserted into the glove mold at the points in the skin material marked by the insert. For example, at step 236 the proper quantity of the lump material is obtained. In one embodiment, at step 236 parts A and B of a suitable material, e.g., e.g., Smooth-On Dragon Skin® are weighed. Optionally colorant is added to part B at step 236. In that regard, the lumps may be colored for visualization within the breast tissue model, e.g., where a clear or translucent breast tissue model is utilized. Further, in some embodiments the lumps are formed of a material that is ultrasonically distinguishable from other portions of the breast tissue model so that they can be identified using standard ultrasound equipment. Parts A and B are mixed at step 238 and poured into a pathology or lump mold at step 240. In that regard, the pathology or lump mold is configured to produce one or more lumps of material to simulate one or more pathologies. In that regard, it is understood that a single mold may produce multiple lumps, where each of the lumps is substantially identical to the others or where each of lumps varies from at least one of the other lumps. Accordingly, it is also understood that a single mold may be utilize to create lumps for representing two or more different types of pathologies. Alternatively, in some instances, a separate mold is provided for each pathology. If necessary, the lump mold is cleaned at step 242, prior to pouring the mixture into the mold. At step 244, the mixture is cured in an oven. The mixture is cured at a temperature between about 3° C. and about 15° C. and, in some instances, is cured at a temperature between about 6° C. and about 9° C. At step 246, the cured lumps are removed from the mold. Once removed from the mold, the lumps can be positioned within the glove mold at the designated positions at step 234.

The method 200 continues at step 248, where the primary tissue material is poured into the glove mold. A suitable material is provided for pouring into the glove mold. In one embodiment, parts A and B of a suitable silicone foam, e.g., Smooth-On Soma-Foama® 15, and an oil, e.g., BJB TC-5005-C, are weighed at step 250. At step 252, parts A and B of the silicone foam are mixed together. At step 254, the mixed silicone foam and the silicone oil are mixed. The mixture of silicone foam and silicone oil forms the tissue material that is poured into the cavity in the glove mold at step 248. In some instances, the silicone mixture is gently agitated once poured into the glove mold until the material starts to foam, and the foam is allowed to cure.

The method 200 continues at step 256, where a backing material is poured over the cured mixture of silicone foam and oil. In some embodiments, backing material is poured into the glove mold until the level of the backing material is substantially equal to the highest level of the skin. In doing so, the backing material and the skin define a generally planar backing surface. Alternatively and as discussed above, the backing material can be contoured to match a base onto which the breast tissue model will be placed. In one such embodiment, an insert or backing mold is utilized to shape the backing material to desired contours. A suitable backing material is provided. In some instances, the backing material is the same material used to form the skin, e.g., Ecoflex® 0010. Accordingly, in some instances, sufficient material for forming the skin and the backing layer are produced at steps 222 and 224. In other instances, the backing material is produced in steps 258 and 260, which are substantially similar to steps 222 and 224 described above.

With all of the materials added to the glove mold, the method 200 continues at step 262 where the product is cured in an oven. The product is cured at a temperature between about 30 C and about 150 C. and, in some instances, is cured at a temperature between about 60 C and about 90 C. After curing, the mother mold is removed from the alignment box at step 264 and the resulting breast tissue model is removed from the glove mold at step 266. If desired, one or more fasteners are then attached to the cured backing material at step 268. In some instances, the fastener(s) are attached with an adhesive. At step 270, talc is applied to the breast tissue model and, finally, the breast tissue model is packaged for shipping at step 272. As the resulting breast tissue model is not water-based it is much easier to transport without damaging the product, while providing unmatched realism in terms of texture and flexibility.

The silicone mixture can be different colors to represent areas of the breast that are the most common places cancer is found. For example, internal parts of the breast can be a different color with muscles at the back of the breast poured at different times as well as in different directions allowing for realism. In that regard, an upper portion of the breast model can formed of a clear or translucent silicone, while the lower portion is formed of a colored silicone to illustrate the location of the internal parts in relation to the outside of the breast. This is similar to the concepts described above with respect to FIG. 3, where the silicone mixture of one of the breasts is colorless or translucent, to allow the pathologies within the breast tissue model to be seen. Further, the use of clear or translucent breast tissue model by itself is advantageous in some instances, as it reduces the tendency of users to simply poke the breast tissue model and encourages users to use the proper breast examination techniques instead of searching for the lumps via poking to receive instant gratification.

The silicone foam can be of different grades and cured at different temperatures or with different catalysts added to change the texture of the silicone. It is possible for each internal part of the breast to have a separate mold. The parts could then be placed inside the breast model with clear silicone poured into the mold to fill and keep the internal parts in place. The internal parts need not be made of silicone; other materials known to those of ordinary skill in the art can be used as well. The resulting breast tissue model product is realistic in appearance and has the proper feel to train individuals in the proper techniques for inspecting the breast. The product can also be used with ultrasound equipment to visualize the lumps.

Figure 5:
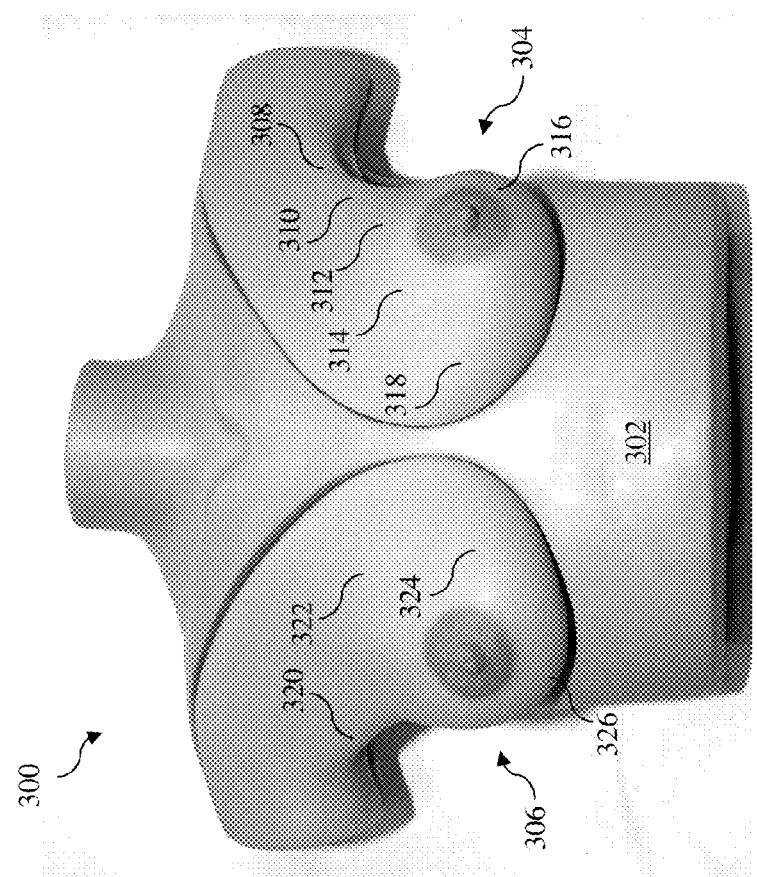
FIG. 5 is a front view of a breast tissue model according to another aspect of the present disclosure.

Referring now to FIG. 5, shown therein is a breast tissue model 300 according to another aspect of the present disclosure. As shown, the breast tissue model 300 includes a torso 302 with a left breast 304 and a right breast 306. Each of the left and right breasts 304, 306 includes a plurality of embedded anatomical features or pathologies. In particular, the left breast 304 includes six different lumps 308, 310, 312, 314, 316, and 318 positioned at various locations. In that regard, lump 308 has a diameter of approximately 15.5 mm and is embedded approximately 0.5 inches below the skin surface. Lump 310 has a diameter of approximately 14.5 mm and is embedded approximately 0.25 inches below the skin surface. Lump 312 has a diameter of approximately 18.0 mm and is embedded approximately 0.25 inches below the skin surface. Lump 314 has a diameter of approximately 17.0 mm and is embedded approximately 0.625 inches below the skin surface. Lump 316 has a diameter of approximately 14.0 mm and is embedded approximately 0.375 inches below the skin surface. Lump 318 has a diameter of approximately 19.0 mm and is embedded approximately 0.5 inches below the skin surface. The left breast 304 of the breast tissue model 300 is particular suited for teaching and training breast self-examination. For example, the lumps 308, 310, 312, 314, 316, and 318 are suitable for teaching both the spiral and grid pattern techniques for breast self-examination. It is understood that other fewer or a greater number of lumps may be utilized and that the positions (in three dimensions) of the lumps may be modified from the examples shown in FIG. 5. Further, it is understood that while the lumps have been described as having a "diameter" this does not imply that the lumps are spherical in shape. To the contrary, it is understood that the lumps will typically have irregular shapes, but may also have spherical and/or other geometrical shapes in some instances. The reference to a "diameter" is simply for explaining the relative size of the lumps and does not provide any limitation to the shape of the lumps.

The right breast 306 incorporates four different pathologies for clinical examination training. In particular, the right breast 306 includes an enlarged lymph node 320, a fibroadenoma breast lump 322, a fibrocystic breast lump 324, and a cyst 326. In that regard, the enlarged lymph node 320 has a diameter of approximately 13.0 mm and is embedded approximately 0.125 inches below the skin surface. The fibroadenoma breast lump 322 has a diameter of approximately 12.0 mm and is embedded approximately 0.25 inches below the skin surface. The fibrocystic breast lump 324 has a diameter of approximately 24.0 mm and is embedded approximately 0.25 inches below the skin surface. The cyst 326 has a diameter of approximately 19.0 mm and is embedded approximately 0.50 inches below the skin surface. Despite the presence of the various anatomical features within each of the left and right breasts 304 and 306, the features are not visible when looking at the skin surfaces of the breasts. In some instances, the anatomical features are colored the same or approximately the same as the skin to prevent visualization of the features through the skin. It is understood that other fewer or a greater number of pathologies may be utilized and that the positions (in three dimensions) of the pathologies may be modified from the examples shown in FIG. 5. Further, it is understood that the left and right breasts may include pathologies for both self-examination training and clinical training.

The left and right breast 304, 306 are manufactured to accurately represent natural breast tissue and axilla regions, with included pathologies. In that regard, sculpted models form the basis of the geometry for the left and right breasts. The sculpted models can be shaped to simulate breasts of varying sizes, shapes, and ages. The sculpted model includes an areola/nipple complex with Montgomery's Tubercles in some instances. In some manufacturing techniques, each breast consists of four layers with the pathologies embedded in pre-defined locations in the third layer. The four layers include the areola, the outer skin, the stroma and/or fat, and the back skin. Typically, the back skin layer forms the back surface of the breast that is used for attaching the breast to the torso 302. The breasts are pigmented to represent light, medium, and dark skin tones and skin tones therebetween.

The first layer of the breast forms the areola. The areola is manufactured from a platinum-cured silicone thermoset with a shore hardness between about 00-10 and about 00-30. Silicone pigments are added to provide realistic coloring to the areola. The areola is sculpted to include a well-defined nipple and Montgomery's Tubercles. In some instances, the material used for forming the areola/nipple region is a silicone thermoset with a shore hardness of 00-10 (e.g., Silicone 99-255, Smooth-On, Inc., Easton, Pa.) as this material has been found by the present inventors to most closely approximate the hardness and texture of the nipple/areola portion of a natural breast.

The second layer of the breast forms the skin. The skin is also manufactured from a platinum-cured silicone thermoset with a shore hardness between about 00-10 and about 00-30. Also, silicone pigments are added to provide realistic coloring to the breast. In some instances, the material used for forming the skin is a silicone thermoset with a shore hardness of 00-10 (e.g., Silicone 99-255, Smooth-On, Inc., Easton, Pa.) as this material has been found by the present inventors to most closely approximates the hardness, texture, and resiliency of the skin of a natural breast.

The third layer of the breast forms the stroma and/or fat layer. The properties of this layer are important to providing a realistic feel to the breast. In that regard, the stroma and/or fat layer provides the structural integrity for the breast. In that regard, the layer provides resiliency that contributes to maintaining the breast shape. The stroma and/or fat layer is manufactured from a soft, two-component, platinum silicone castable foam blended with a silicone oil. The addition of the silicone oil allows manipulation of the foam's properties, including hardness and foam density. The percentage foam ranges from about 16% to about 33% of the total weight, and the percentage silicone oil ranges from about 67% to about 84% of the total weight. In some instances, the silicone foam (e.g., Soma Foama, Smooth-On, Inc., Easton, Pa.) and silicone oil (e.g., TC-5005 C, BJB Enterprises, Tustin, Ca) are blended so that the mass of the silicone oil ranges from about 200% to about 500% relative to the mass of the foam. In one particular embodiment found to be particularly suitable for simulating breast tissue, the percentage of oil is approximately 77.6% of the total weight (approximately 350% relative to the mass of the foam).

The fourth layer of the breast forms the backing or back skin. The purpose of this layer is to encapsulate the foam layer while providing a surface that can be used for attachment to a torso, demonstration stand, or other base. This layer is manufactured from a platinum-cured silicone thermoset with a shore hardness ranging from about 00-10 to about 00-45. The material selected for the backing should not be too much harder than the material selected for the second layer (skin) in order to prevent a distinct intersection or transition between the skin layer and the backing. Accordingly, in some embodiments where the material of the skin layer has a hardness of 00-10, the backing has a hardness less than 00-45. In some instances, the back will have the same durometer or hardness as the skin layer. Since the foam of the third layer (stroma and/or fat layer) often creates a non-uniform surface, the backing aids in gap filling and can contribute to the overall appearance and feel of the breast. Silicone pigments are added to the backing to provide realistic coloring and a color match to the skin layer. In some embodiments, hook-and-loop and/or other attachment features are secured to the backing using a silicone adhesive (e.g., Sil-Poxy Silicone Adhesive, Smooth-On, Inc., Easton, Pa.). In some embodiments, the material used to form backing is a silicone thermoset with a shore hardness of 00-10 (e.g., Silicone 99-255, Smooth-On, Inc., Easton, Pa.) as this material has been found by the present inventors to most closely approximates the hardness, texture, and resiliency of the skin of a natural breast.

The pathologies (i.e., lumps, lymph nodes, cysts, etc.) are embedded within the foam layer at the surface of the skin. In that regard, the left breast 304 includes irregular lumps 308, 310, 312, 314, 316, and 318 that are scattered throughout the breast tissue at different depths. These lumps are manufactured from a platinum-cured silicone thermoset with a shore hardness ranging from about 10A to about 30A. In some embodiments, silicone pigments are added to the lumps to achieve a color match to the skin. Coloring the lumps ensures that the lumps cannot be viewed through the skin. This helps make sure a student learns the proper grid or spiral technique for lump detection and is not simply viewing the lumps through the skin layer. In some embodiments, the lumps are manufactured from a silicone thermoset with a shore hardness of 10A (e.g., Dragon Skin® 10 Medium, Smooth-On, Inc., Easton, Pa.). Generally, the lumps range in size from 14.0-19.0 mm and are located at depths ranging from 0.125 inches to 0.75 inches below the skin surface. However, in other embodiments the lumps may be smaller than 14.0 mm, larger than 19.0 mm, positioned less than 0.125 inches from the skin surface, and positioned more than 0.75 inches from the skin surface. In the illustrated embodiment of FIG. 5, two lumps are located in the axilla region, one lump is located under the areola, another lump one is located in the upper-outer quadrant of the breast body, and the final two lumps are located in the upper-inner quadrant. Again, however, it is understood that the lumps are positioned elsewhere in other embodiments.

The right breast 306 includes four different pathologies for the training of clinical breast examination: an enlarged lymph node 320, a fibroadenoma breast lump 322, a fibrocystic breast lump 324, and a cyst 326. As with the pathologies of the left breast 304, the enlarged lymph node 320 and the fibrocystic breast lump 324 are manufactured from a platinum-cured silicone thermoset with a shore hardness ranging from about 10A to about 30A. Again, silicone pigments may be added to achieve a color match to the skin. The size and shape of the enlarged lymph node 320 and the fibrocystic breast lump are selected to ensure a close match to the pathology they are trying to represent. In some embodiments, the material used for the lymph node 320 and the fibrocystic breast lump 324 is a silicone thermoset with a shore hardness of 10A (e.g., Dragon Skin® 10 Medium, Smooth-On, Inc., Easton, Pa.).

The fibroadenoma breast lump 322 and the cyst 326 are multi-layer structures formed to replicate the natural feel of these pathologies. In that regard, to put the feeling in everyday terms, the cyst 326 may be understood replicates the feel of a soft grape. In order to replicate the feel of the skin and soft interior of a grape, the cyst model includes a two-layer structure with a platinum-cured silicone thermoset skin (ranging in hardness from about 00-20 to about 15A), and a platinum-cured silicone thermoset/silicone oil blend to form a gel interior (having a hardness less than about 00-10). The percentage oil for the gel interior ranges from about 0% to about 75% of the total mass of the blend, while the silicone thermoset ranges from about 25% to about 100%. In some embodiments, the material used as the cyst skin is a silicone thermoset with a shore hardness of 00-30 (e.g., Ecoflex 0030, Smooth-On, Inc., Easton, Pa.) and is formed with a total thickness less than about 2.0 mm. Further, in some embodiments the material used as the gel interior is a blend of silicone thermoset of hardness 00-10 (e.g., Silicone 99-255, Smooth-On, Inc., Easton, Pa.) with silicone oil (e.g., TC-5005 C, BJB Enterprises, Tustin, Ca), where the silicone oil comprises approximately 33% of the total mass.

In contrast to the cyst 326, the fibroadenoma breast lump 322 feels like a small rubbery ball that moves around within the breast. In order the achieve the movement of the fibroadenoma within the breast while not impacting the rubbery feel of the lump, a platinum-cured silicone thermoset with a shore hardness ranging from about 10A to about 30A is encased within a gel comprising a platinum-cured silicone thermoset/silicone oil blend with a hardness less than about 00-10. The percentage oil for the gel exterior ranges from about 0% to about 75% that of the total mass of the blend, while the silicone thermoset ranges from about 25% to about 100%. In some embodiments, the material used for interior, rubbery ball portion of the fibroadenoma breast lump is a silicone thermoset with a shore hardness of 10A (e.g., Dragon Skin® 10 Medium, Smooth-On, Inc., Easton, Pa.). In some embodiments, the material used as the gel casing is a blend of silicone thermoset of hardness 00-10 (e.g., Silicone 99-255, Smooth-On, Inc., Easton, Pa.) with silicone oil (e.g., TC-5005 C, BJB Enterprises, Tustin, Ca), where the silicone oil comprises 33% of the total mass.

Figure 6:
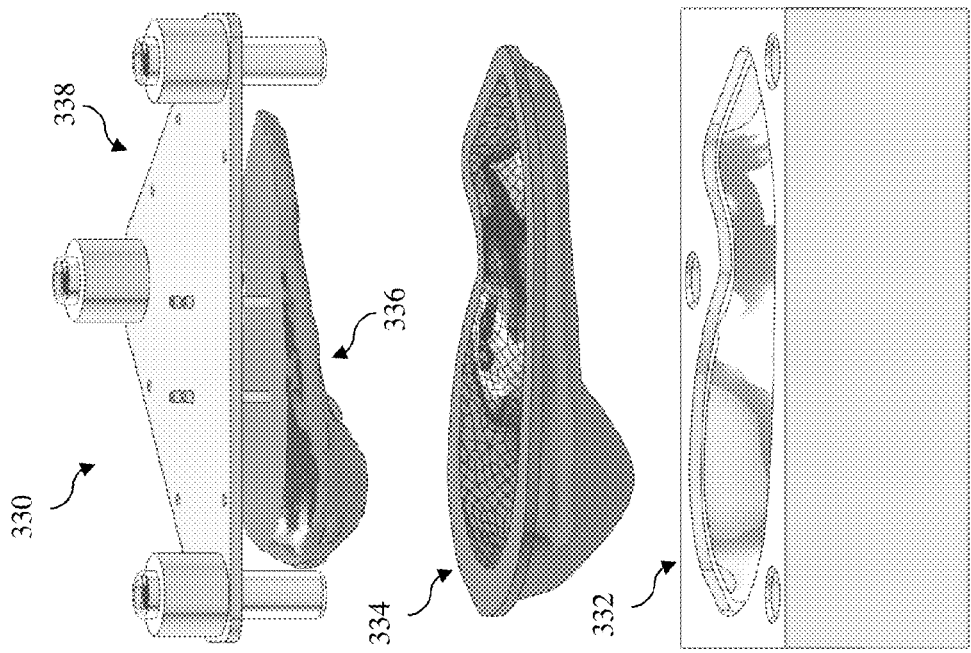
FIG. 6 is a perspective view of a molding system for forming a breast tissue model according to an aspect of the present disclosure.
Figure 9:
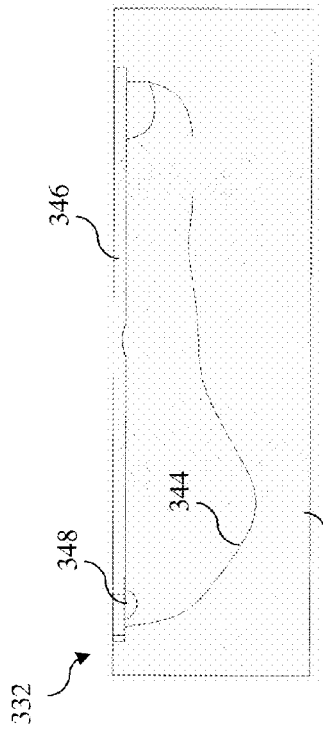
FIG. 9 is a cross-sectional side view of the mother mold of FIGS. 7 and 8, taken along section line 9-9 of FIG. 8.
Figure 10:
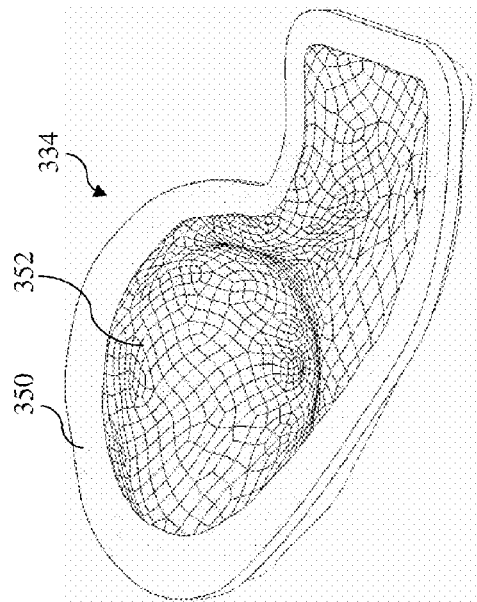
FIG. 10 is a perspective view of a glove mold of the molding system of FIG. 6.
Figure 7:
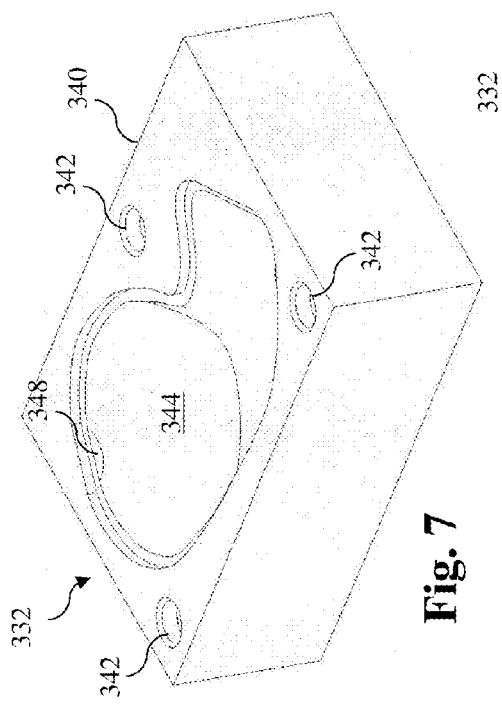
FIG. 7 is a perspective view of a mother mold of the molding system of FIG. 6.
Figure 8:
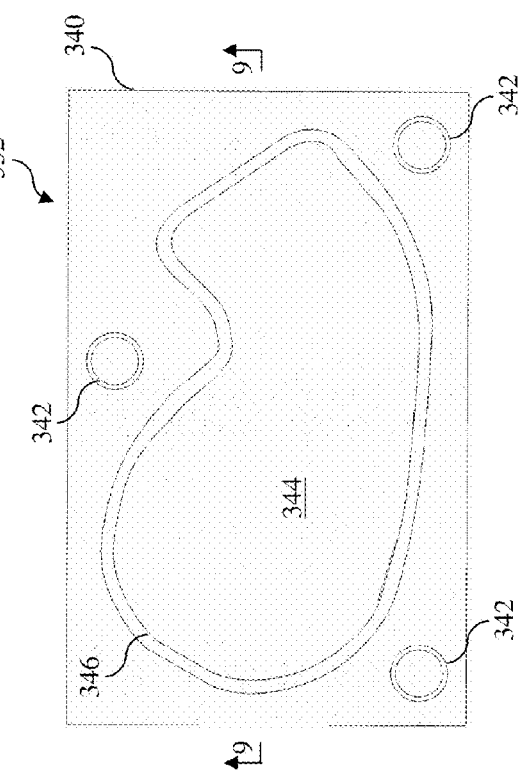
FIG. 8 is a top view of the mother mold of FIG. 7.
Figure 15:
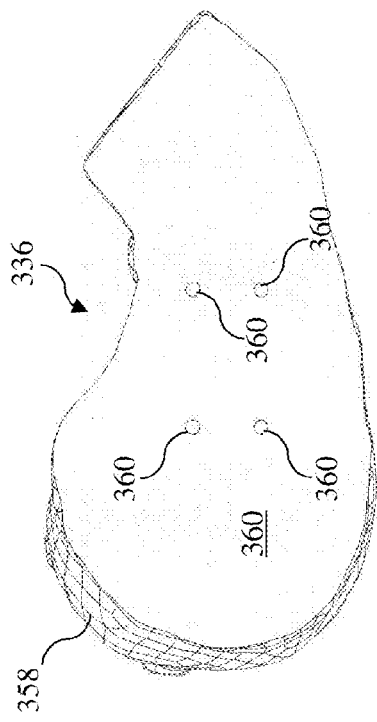
FIG. 15 is a cross-sectional side view of the assembled mother mold and glove mold of FIG. 14, taken along section line 15-15 of FIG. 14.
Figure 18:
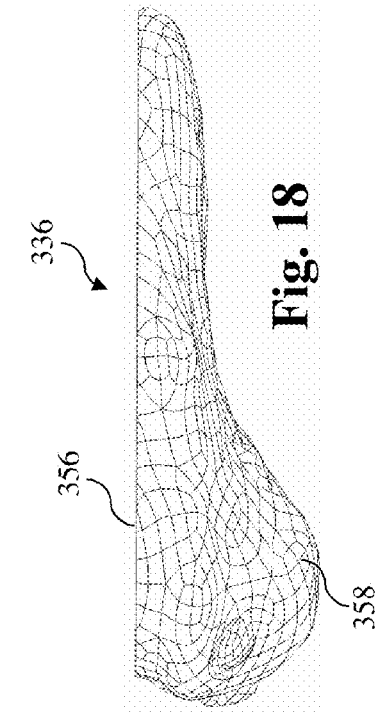
FIG. 18 is a side view of the insert mold of FIGS. 16 and 17.
Figure 17:
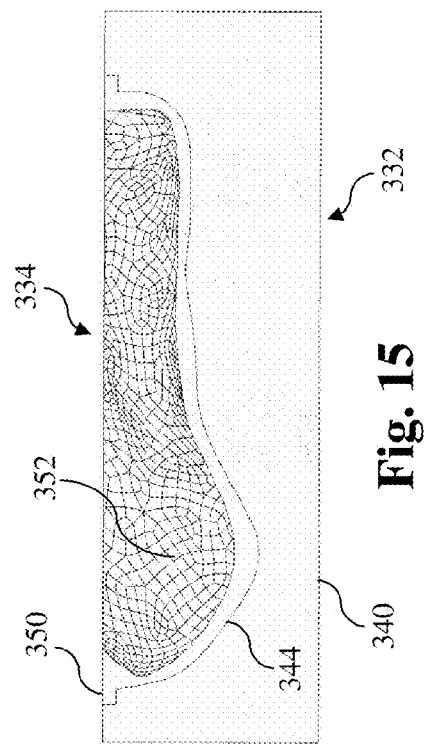
FIG. 17 is a top view of the insert mold of FIG. 16.
Figure 16:
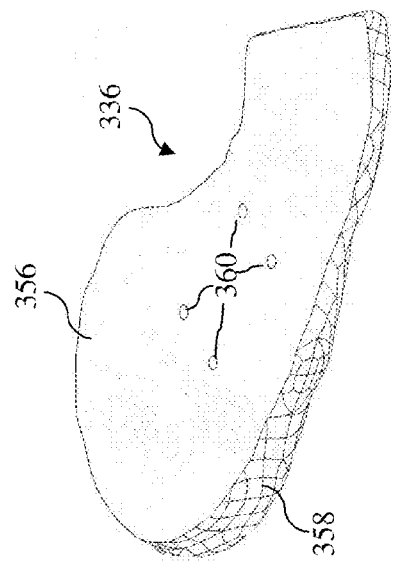
FIG. 16 is perspective view of an insert mold of the molding system of FIG. 6.
Figure 23:
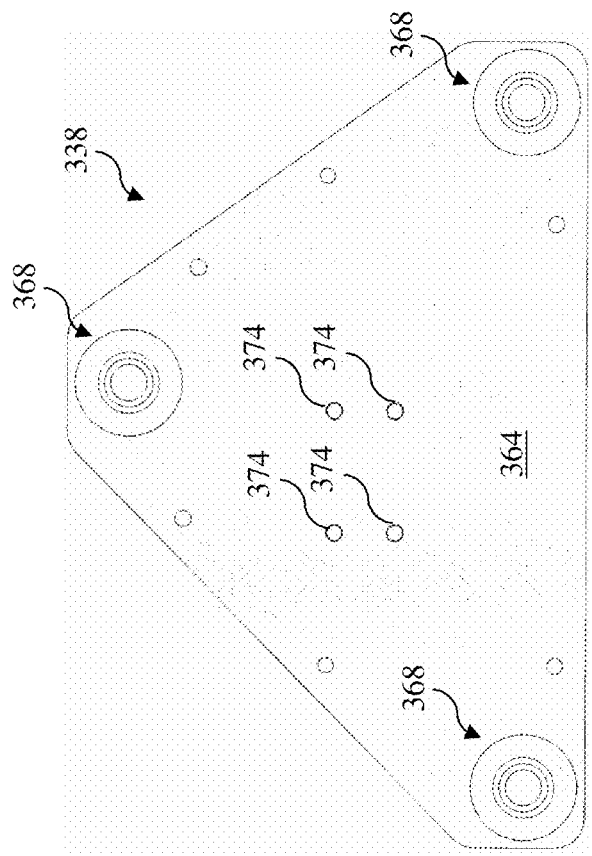
FIG. 23 is a top view of the gantry of FIGS. 21 and 22.

Referring now to FIGS. 6-23, shown therein are aspects of a molding system 330 for forming a breast tissue model, such as left and right breasts 304 and 306 of breast tissue model 300 described above, according to embodiments of the present disclosure. Specifically, FIG. 6 is a perspective view of the molding system 330; FIG. 7 is a perspective view of a mother mold 332 of the molding system; FIG. 8 is a top view of the mother mold; FIG. 9 is a cross-sectional side view of the mother mold taken along section line 9-9 of FIG. 8; FIG. 10 is a perspective view of a glove mold 334 of the molding system; FIG. 11 is a top view of the glove mold; FIG. 12 is a side view of the glove mold; FIG. 13 is a cross-sectional side view of the glove mold taken along section line 13-13 of FIG. 11; FIG. 14 is a top view of the mother mold and the glove mold assembled together; FIG. 15 is a cross-sectional side view of the assembled mother mold and glove mold taken along section line 15-15 of FIG. 14; FIG. 16 is perspective view of an insert mold 336 of the molding system; FIG. 17 is a top view of the insert mold; FIG. 18 is a side view of the insert mold; FIG. 19 is a side view of the insert mold; FIG. 20 is a bottom view of the insert mold; FIG. 21 is a perspective view of a gantry of the molding system; FIG. 22 is a side view of the gantry; and FIG. 23 is a top view of the gantry.

Referring more specifically to FIGS. 7-9, aspects of the mother mold 332 will be described. The mother mold 332 includes a main body 340 having a generally rectangular shape. The body 340 includes a plurality of recesses or openings 342 that are configured to receive projections of the gantry 338 to facilitate proper alignment and assembly of the mold system 330, as will be discussed below. The mother mold 332 also includes a recess or depression 344 that is sized, shaped, and contoured to simulate an outer surface of a natural breast and/or surrounding tissue. In that regard, the particular size, shape, and contour of the depression 344 is selected based on the type (size, shape, age, etc.) of breast to be simulated. The mother mold 332 includes a rim 346 that substantially surrounds the depression 344. In some instances, the rim 346 is sized and shaped to interface with a portion of the glove mold 334, as discussed below. Further, in some embodiments the mother mold 332 includes a feature or structure to facilitate separation of the glove mold 334 from the mother mold 332. In the illustrated embodiment, the mother mold 332 includes cutout 348 that allows access to the glove mold 334 when the glove mold and the mother mold are assembled together. In some embodiments, the mother mold 332 is formed of machined aluminum 6061 based on a model created using a 3D CAD system.

Referring more specifically to FIGS. 10-13, aspects of the glove mold 334 will be described. As shown, the glove mold 334 includes a rim 350 that defines an outer boundary of the glove mold. In some instances, the rim 350 is configured to interface with the rim 346 of the mother mold 332. The glove mold 334 also includes an inner surface 352 and an opposing outer surface 354. In some embodiments, the glove mold 334 is designed to follow simplified contours of a sculpted breast model. In that regard, detailing may be simplified in the areola/nipple complex so that the outside surface 354 of the glove mold 334 includes smooth contours and no undercuts. The internal geometry of the glove mold 334 as defined by the inner surface 352 replicates that of the sculpted breast model. Accordingly, products manufactured in the glove mold will be a replica of that model. The depression 344 of the mother mold 332 is the negative of the outer surface 354 of the glove mold 334 so that the glove mold 334 and the mother mold will mate together. For example, as shown in FIGS. 14 and 15, when the glove mold 334 is mated with the mother mold 332, the outer surface 354 of the glove mold is a generally perfect fit relative to depression 344 of the mother mold. In that regard, in some instances the glove mold 334 is manufactured within the mother mold 332 such that the mother mold forms the outer surface 354 and a master mold forms the inner surface 352. The glove mold 334 is manufactured from a platinum-cured silicone thermoset with a shore hardness between about 10A and about 30A. In some instances, the material used for the glove mold is a silicone thermoset with a shore hardness of 10A (e.g., Dragon Skin® 10 Medium, Smooth-On, Inc., Easton, Pa.). The viscosity of this material makes it a good choice for a glove mold as it allows easy pouring and de-gassing of the material, with a cured flexibility that can be easily inverted to aid in product de-molding. Further, in the event that the glove mold 334 is damaged, the design of the molding system 330 makes it easy to replace the glove mold without having to replace the mother mold 332 and/or other components of the system.

Referring now to FIGS. 16-20, aspects of the insert mold 336 will be described. As shown, the insert mold 336 includes an upper surface 356 and an opposing lower surface 358. In that regard, the upper surface 356 is substantially planar, while the lower surface 358 is contoured in a manner that will result in marking of the appropriate positions for the formation of pathologies. The upper surface 356 includes a plurality of features 360 that are configured to connect the insert mold 336 to the gantry 338. In that regard, in some embodiments the features 360 are opening sized and shaped to receive a projection extending from the gantry 338. In some particular openings, the features 360 are threaded openings. However, generally any mechanism may be utilized to connect the insert mold 336 to the gantry 338. In use, the inner surface 352 of the glove mold 334 is clayed to represent the breast skin. Locator marks denoting the positions for the pathologies are placed in the clay, and the casting material used to form the insert mold 336 is poured directly into the clay. This forms the insert mold 336 whose geometry allows the formation of the skin layer with provisions for the embedded lumps during the breast manufacturing process. The thickness of the clay ranges from about 3.0 mm to about 13.0 mm. In some particular embodiments, the clay has thickness of approximately 6.0 mm. In some embodiments, the material used for the insert mold 336 is an aluminum-filled urethane with a shore hardness of 88D (e.g., Task® 18, Smooth-On, Inc., Easton, Pa.). In that regard, the aluminum filling aids the urethane in heat transfer, thereby improving the manufacturability of the breast mold. Also, the cure time of platinum-cured silicones is decreased at elevated temperatures.

Referring now to FIGS. 21-23, aspects of the gantry 338 will be described. As shown, the gantry 338 includes a body 362 having an upper surface 364 and an opposing lower surface 366. A plurality of connectors 368 extend through the body 362. In the illustrated embodiment, the connectors 368 are generally positioned around the perimeter of the gantry 338. Each of the connectors 368 includes a lower portion 370 (positioned below body 362) and an upper portion 372 (positioned above body 362). In that regard, the lower portions 370 are sized and shaped to interface with the openings 342 in the mother mold 332. Similarly, a plurality of rods 374 extend through the body 362. In the illustrated embodiment, the rods 374 are generally positioned centrally relative to the perimeter of the gantry 338. In that regard, the rods 374 are configured to interface with the features 360 of the insert mold 336 in order to connect the insert mold to the gantry (as shown in FIG. 6). In some embodiments, the gantry 338 is formed of machined aluminum 6061 based on a model designed in a 3D CAD system. Aspects of utilizing the molding system 330 are also discussed below with respect to Example 2, manufacturing a breast model with medium skin tone.

Figure 24:
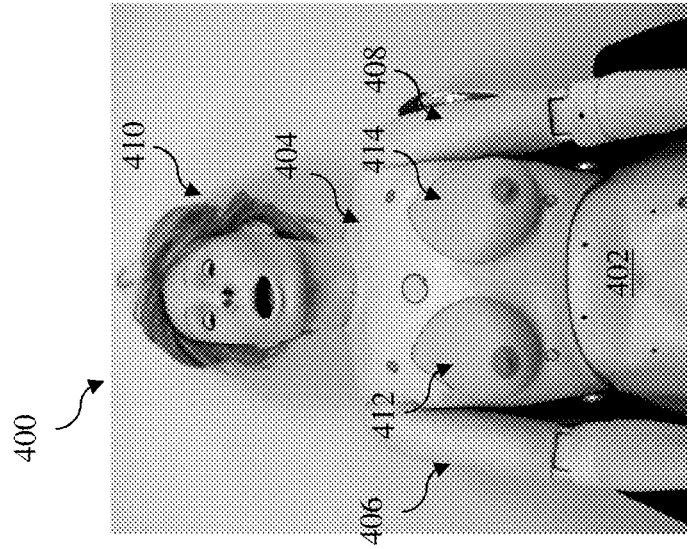
FIG. 24 is a front view of a breast tissue model according to another aspect of the present disclosure.

Referring now to FIG. 24, shown therein is a breast tissue model 400 according to another aspect of the present disclosure. In that regard, the breast tissue model 400 includes a lower torso portion 402, an upper torso portion 404, a left arm 406, a right arm 408, and a head 410. A right breast 412 and a left breast 414 extend through openings in the upper torso portion 404. In some instances, the right and left breasts 412, 414 are removably attached to the upper torso portion 404. In that regard, the breasts 412, 414 are similar in many respects to the breasts 304, 306 described above. For example, the breasts 412, 414 are formed of materials simulating natural breasts, including various pathologies. In that regard, the breasts 412, 414 may also be manufactured in a 4-layer configuration. However, the breasts 412, 414 are designed for use on an adult manikin that already has arm and axilla regions. Accordingly, in the illustrated embodiment the breasts 412, 414 do not include axilla regions of the breasts 304, 306 shown above. In some instances, the breasts 412, 414 are designed to be inserts into a skin cover of the manikin, where the geometries of the breasts match the contours of the torso of the manikin. In some instances, the breasts 412, 414 include a wide flange area that allows them to be secured in place on the manikin. In some instances, a plurality of breasts are provided for interchangeable use with the manikin. For example, in some instances breasts having various pathologies are provided for interchangeable use. The following seven examples of pathologies are provided to illustrate the wide variety of breast pathologies that may be provided, but in no way limit the combinations and/or types of pathologies that may be provided in accordance with the present disclosure. (1) a normal breast; (2) a breast with four discreet nodes sizes of approximately 8.0 mm, 10.0 mm, 16.0 mm, and 20.0 mm; (3) a breast with six discreet nodes on one side and a somewhat larger node on the other side of the breast. This breast represents (in a slightly exaggerated form) various stages of fibrocystic disease (chronic mastitis) that is due to an endocrine imbalance and is found in many normal women; (4) a breast with a solitary tumor. The tumor is well circumscribed and has a stalk in some instances. In that regard, the tumor can be moved and is not adherent to the breast tissue. The tumor is benign and usually occurs in younger women. (5) a breast with a relatively rare but palpable tumor, such as a giant sarcoma (or giant mammary myxoma) of which the wildly growing masses can be easily felt. (6) a breast with a form of breast cancer (scirrhus carcinoma). This is one of the more commonly encountered malignant tumors of the breast. When palpating, the infiltrating nature of the growth is notable. The tumor has no well-defined borders and cannot be moved within the breast. (7). A breast with a retracted nipple, and on careful palpation, a mass can be felt immediately under the nipple. This breast represents a carcinoma in one of the milk ducts.

Figure 26:
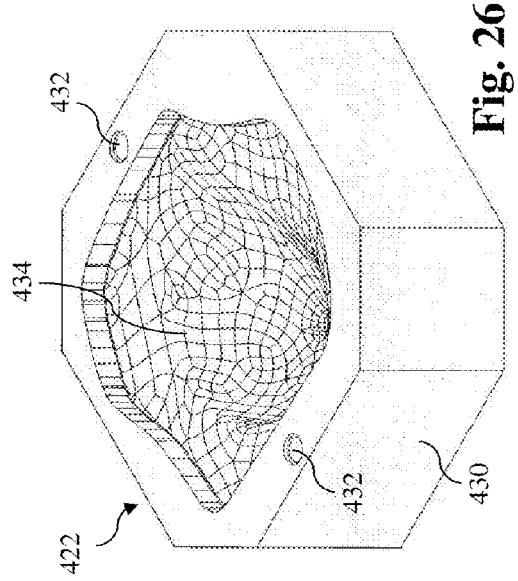
FIG. 26 is a perspective view of a mother mold of the molding system of FIG. 25.
Figure 27:
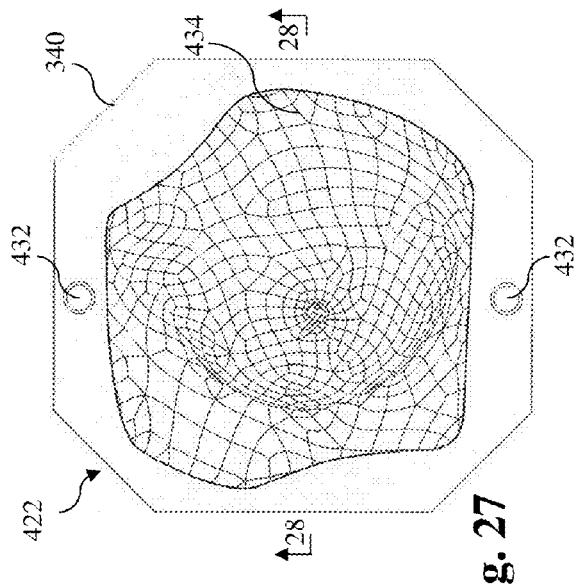
FIG. 27 is a top view of the mother mold of FIG. 26.
Figure 25:
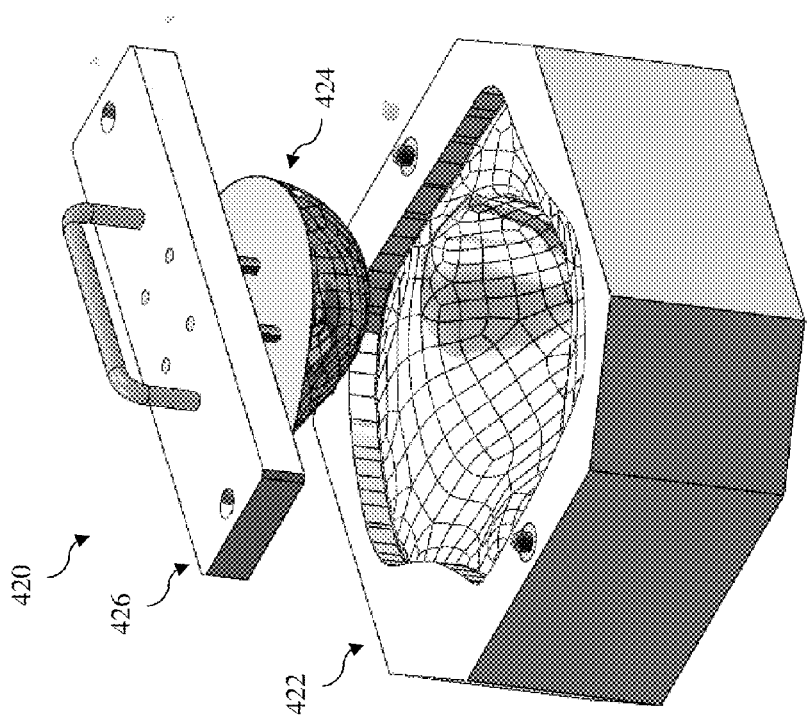
FIG. 25 is a perspective view of a molding system for forming a breast tissue model according to another aspect of the present disclosure.
Figure 30:
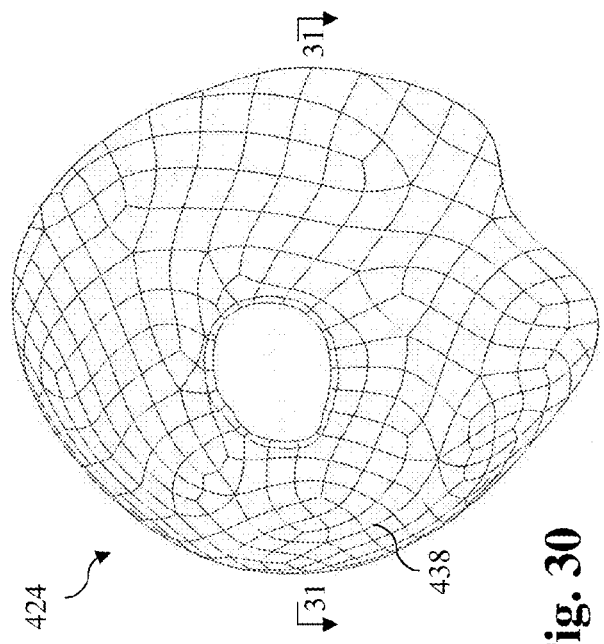
FIG. 30 is a bottom view of the insert mold of FIG. 29.
Figure 31:
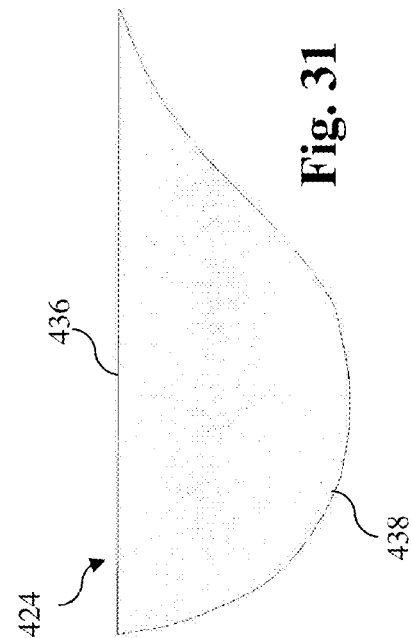
FIG. 31 is a cross-sectional side view of the insert mold of FIGS. 29 and 30, taken along section line 31-31 of FIG. 30.
Figure 28:
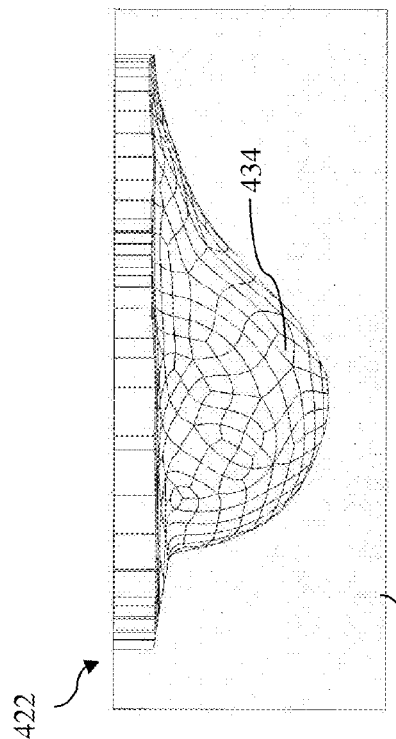
FIG. 28 is a cross-sectional side view of the mother mold of FIGS. 25 and 26, taken along section line 28-28 of FIG. 27.
Figure 29:
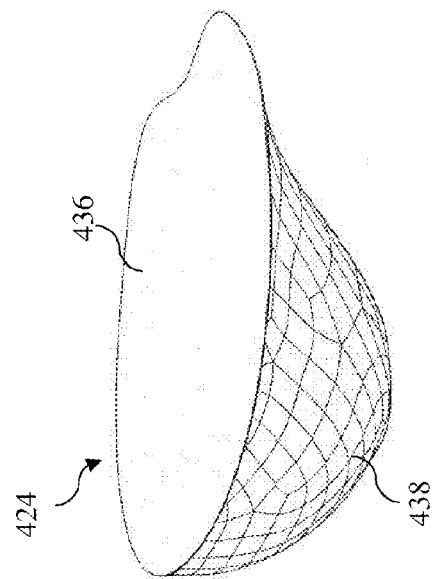
FIG. 29 is a perspective view of an insert mold of the molding system of FIG. 25.
Figure 32:
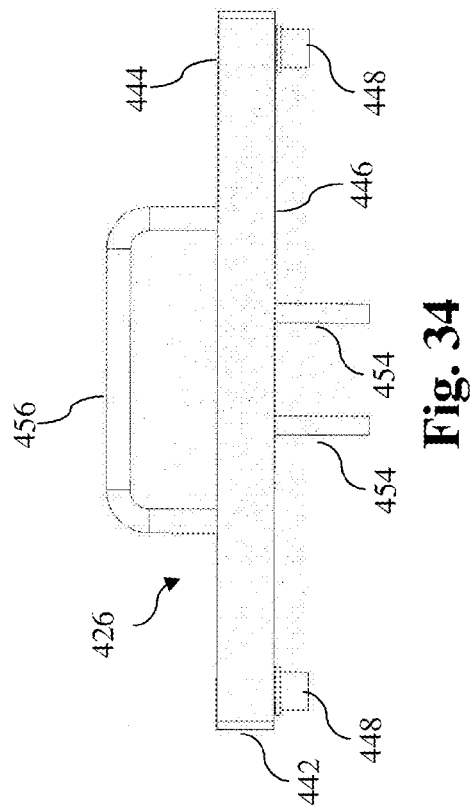
FIG. 32 is a perspective view of a bridge of the molding system of FIG. 25.
Figure 34:
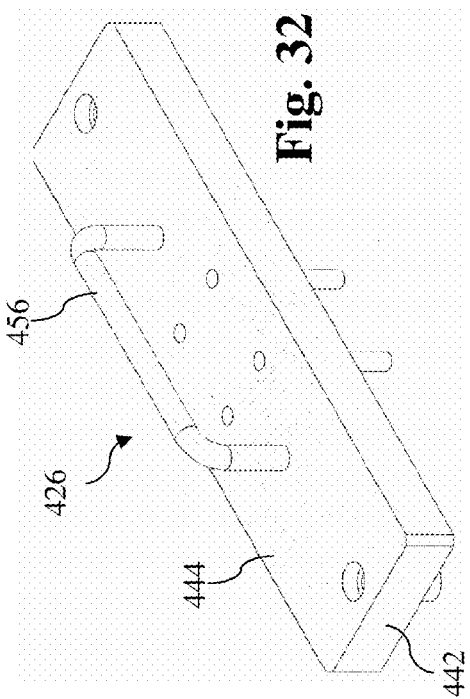
FIG. 34 is a side view of the bridge of FIGS. 32 and 33.
Figure 33:
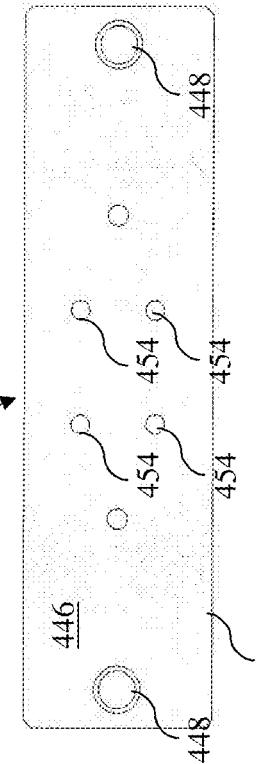
FIG. 33 is a top view of the bridge of FIG. 32.
Figure 35:
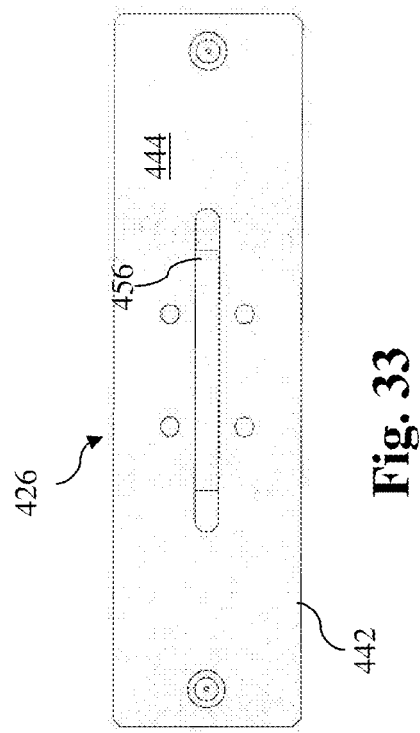
FIG. 35 is a bottom view of the bridge of FIGS. 32-34.
Figure 36:
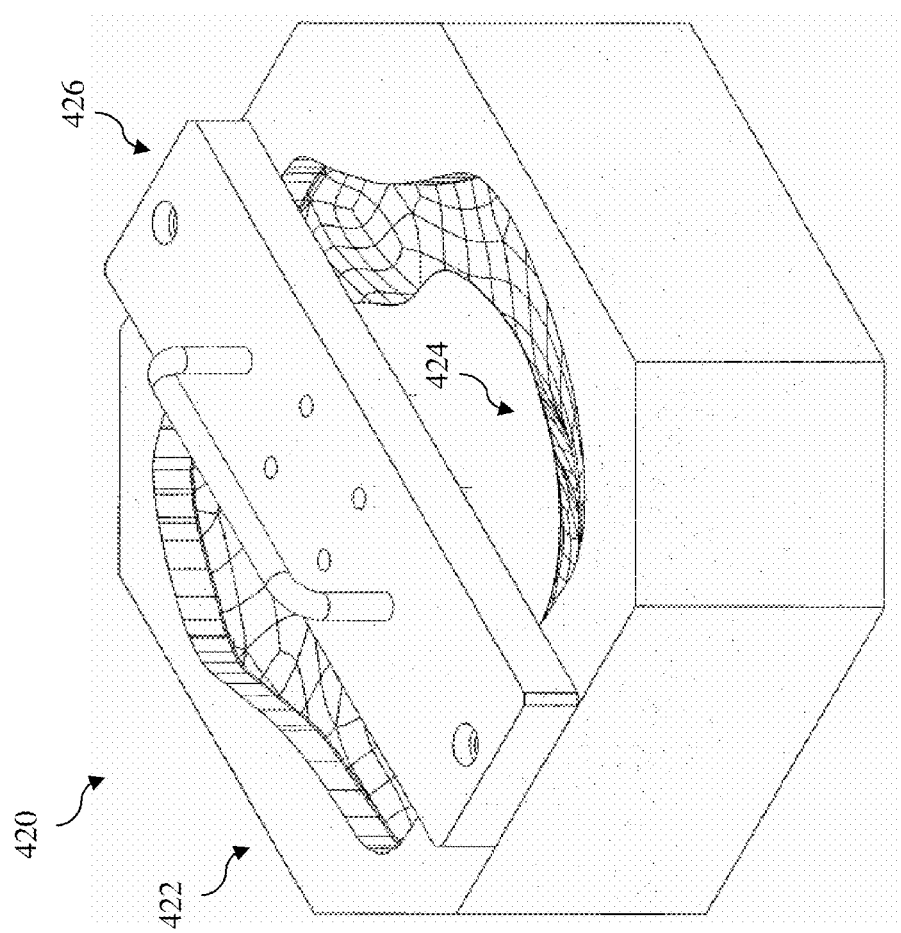
FIG. 36 is a perspective view of the molding system of FIG. 25 with the mother mold of FIGS. 26-28, the insert mold of FIGS. 29-31, and the bridge of FIGS. 32-35 assembled together.

Referring now to FIGS. 25-36, shown therein are aspects of a molding system 420 for forming a breast for use with a manikin, such as breast 412 or breast 414, according to embodiments of the present disclosure. Specifically, FIG. 25 is a perspective view of the molding system 420; FIG. 26 is a perspective view of a mother mold 422 of the molding system; FIG. 27 is a top view of the mother mold; FIG. 28 is a cross-sectional side view of the mother mold taken along section line 28-28 of FIG. 27; FIG. 29 is a perspective view of an insert mold 424 of the molding system; FIG. 30 is a bottom view of the insert mold; FIG. 31 is a cross-sectional side view of the insert mold taken along section line 31-31 of FIG. 30; FIG. 32 is a perspective view of a bridge 426 of the molding system; FIG. 33 is a top view of the bridge; FIG. 34 is a side view of the bridge; FIG. 35 is a bottom view of the bridge; and FIG. 36 is a perspective view of the molding system with the mother mold, insert mold, and bridge assembled together.

Referring more specifically to FIGS. 26-28, aspects of the mother mold 422 will be described. The mother mold 422 includes a main body 430 having a generally rectangular shape. The body 430 includes a plurality of recesses or openings 432 that are configured to receive projections of the bridge 426 to facilitate proper alignment and assembly of the mold system 420. The mother mold 422 also includes a recess or depression 434 that is sized, shaped, and contoured to simulate an outer surface of a natural breast and/or surrounding tissue. In that regard, the particular size, shape, and contour of the depression 434 is selected based on the type (size, shape, age, etc.) of breast to be simulated. In some embodiments, the mother mold 422 is formed of machined aluminum 6061 based on a model created using a 3D CAD system.

Referring more specifically to FIGS. 29-31, aspects of the insert mold 424 will be described. As shown, the insert mold 424 includes an upper surface 436 and an opposing lower surface 438. In that regard, the upper surface 436 is substantially planar, while the lower surface 438 is contoured in a manner that will result in marking of the appropriate positions for the formation of pathologies. Though not shown in the illustrated embodiment, the upper surface 436 includes a plurality of features that are configured to connect the insert mold 424 to the bridge 426 in some instances. It should be noted that the present molding system 420 does not require a glove mold because the breast geometry does not include any undercuts. In some embodiments, the material used for the insert mold 424 is an aluminum-filled urethane with a shore hardness of 88D (e.g., Task® 18, Smooth-On, Inc., Easton, Pa.). In that regard, the aluminum filling aids the urethane in heat transfer, thereby improving the manufacturability of the breast mold. Also, the cure time of platinum-cured silicones is decreased at elevated temperatures.

Referring now to FIGS. 32-35, aspects of the bridge 426 will be described. As shown, the gantry 426 includes a body 442 having an upper surface 444 and an opposing lower surface 446. A plurality of connectors 448 extend through the body 442. In the illustrated embodiment, the connectors 448 are generally positioned at opposing ends of the bridge 426. Each of the connectors 448 is sized and shaped to interface with the openings 432 in the mother mold 422. In that regard, the connectors 448 extend downward from the lower surface 446 of the body 442. Similarly, a plurality of rods 454 extend downward from the body 442. In the illustrated embodiment, the rods 454 are generally positioned centrally relative to the perimeter of the bridge 426. In that regard, the rods 454 are configured to interface with the features of the insert mold 424 in order to connect the insert mold to the bridge (as shown in FIG. 25). The bridge 426 also includes a handle 456 that extends upward from the body 442. In some embodiments, the bridge 426 is formed of machined aluminum 6061 based on a model designed in a 3D CAD system. Aspects of utilizing the molding system 420 are also discussed below with respect to Example 3, manufacturing a breast model with medium skin tone.

EXAMPLES

The invention is further defined by reference to the following examples, describing in detail the manufacture of the models of the present invention. These examples are for illustrative purposes only, and are not to be construed as limiting the appended claims.

Example 1

Manufacture of Breast for Self-Examination

To manufacture a simulated breast model product according to the present invention, the following materials and processes were used.

A. Simulated Skin Material

The skin surrounding the breast tissue was formed from Smooth-On Ecoflex® 0010. The left breast included a colorant, while the right breast was free of colorant to stay translucent. The thickness of the skin was about 6 mm±1 mm, and weighed about 400 grams.

B. Simulated Fat Material

The fat of the simulated breast was formed from one part Smooth-On Soma-Foama® 15 and two parts BJB Enterprise TC-5005C. One hundred forty eight grams of Soma-Foama® 15 was added to 296 grams of TC-5005C. No colorant was used in the right breast so that it remains translucent. The left breast included a colorant. The volume of each breast was 600 cm³.

C. Backing Layer/Cover Material

The back layer of the breast model product was formed from Smooth-On Ecoflex® 0010. The thickness of the back layer was about 2 mm±0.5 mm. This outer layer was formed over the mold to allow a thinner skin, which is a closer simulation to human skin. The weight added to each breast is 100 grams. Again, the left breast included colorant, and the right breast included none to remain translucent.

D. Nipple Material

A nipple was produced for the left breast only and formed from Smooth-On Ecoflex® 0010. A proper colorant was determined, and the final weight of the nipple was about 5 grams.

E. Master Lump Material

The lumps were formed from Smooth-On Dragon Skin®. The physical shape of the lumps was purposely made irregular to simulate real lumps. The lumps were approximately 3.3 mm deep, 17 mm wide, and 20 mm long and positioned against the skin 5.5 mm below the surface. The lumps were positioned in natural locations relative to the surface. For the right breast, one lump was located under the nipple, three lumps in the breast tissue away from the nipple, and one lump in the underarm area. The location of lumps in the left breast was different than the right breast. The weight of the lumps was about 20 grams per breast.

Example 2

Manufacture of Breast Model (e.g., similar to Breast Model 300) with Medium Skin Tone Manufacture Areolas (Material: Silicone 99-255):
a. Measure 60 g of Part B, add 12 drops (approximately 0.6 mL) of FuseFX Warm Rosy skin, 30 drops (approximately 1.5 mL) of FuseFX Tan Flesh, 60 g Part A
b. Mix and Vacuum until all bubbles are removed.
c. Pour into silicone areola molds
d. Cure in a 100° C. Oven for 30 minutes, clean with isopropanol.

Manufacture Left Breast Lumps, Lymph Node, and Fibrocystic Lump (Material Dragon Skin 10 Medium)
a. Measure 30 g Part B, add 3 drops (approximately 0.15 mL) of FuseFX Tan Flesh, 12 drops (approximately 0.6 mL) of FuseFX Warm Rosy Skin, 30 g of Part A
b. Mix and Vacuum until all bubbles are removed
c. Pour into silicone lump molds
d. Cure in a 100° C. Oven for 30 minutes Manufacture Cyst Manufacture the gel interior first. Fill the mold for the solid casing half full, and drop the Gel Interior into place. Completely fill the mold with the Solid Casing so that the gel interior is encapsulated.

a. Gel Interior (Materials: Silicone 99-255 & TC 5005C)
  Measure 20 g 99-255 Part B, add 20 g TC 5005C, 2 drops (approximately 0.1 mL) of FuseFX Tan Flesh, 8 drops (approximately 0.4 mL) of FuseFX Warm Rosy Skin and mix until uniform
  Add 20 g 99-255 Part A
  Mix and Vacuum until all bubbles are removed
  Pour into silicone lump mold
  Cure in a 100° C. Oven for 30 minutes
b. Solid Casing (Material: Ecoflex 0030)
  Measure 20 g Part B, add 2 drops (approximately 0.1 mL) of FuseFX Tan Flesh, 8 drops (approximately 0.4 mL) of FuseFX Warm Rosy Skin, 20 g Part A
  Mix and Vacuum until all bubbles are removed
  Pour into silicone lump mold
  Cure in a 100° C. Oven for 30 minutes Manufacture Fibroadenoma Manufacture the Solid Interior first. Fill the mold for the Gel Casing half full, and drop the Solid Interior into place. Completely fill the mold with the Gel Casing.

a. Solid Interior (Material: Dragon Skin 10 Medium)
  Measure 30 g Part B, add 3 drops (approximately 0.15 mL) of FuseFX Tan Flesh, 12 drops (approximately 0.6 mL) of FuseFX Warm Rosy Skin, 30 g of Part A
  Mix and Vacuum until all bubbles are removed
  Pour into silicone mold
  Cure in a 100° C. Oven for 30 minutes
b. Gel Casing (Materials: Silicone 99-255 & TC 5005C)
  Measure 20 g 99-255 Part B, add 20 g TC 5005C, 2 drops (approximately 0.1 mL) of FuseFX Tan Flesh, 8 drops (approximately 0.4 mL) of FuseFX Warm Rosy Skin, 20 g 99-255 Part A
  Mix and Vacuum until all bubbles are removed
  Pour into silicone mold
  Cure in a 100° C. Oven for 30 minutes Manufacture Outer Skin a. Clean the mold and liberally apply mold release.
b. Place the areola in position, making sure that it fits snugly and that there are no gaps, especially around the edges.
c. Prepare the Outer Skin Mixture for one breast (Material: Silicone 99-255):
  Measure 240 g Part B, add 12 drops (approximately 0.6 mL) FuseFX Light Skin, 12 drops (approximately 0.6 mL) FuseFX Tan Skin, 10 drops (approximately 0.5 mL) FuseFX Warm Rosy Skin, 240 g Part A
  Mix and Vacuum until all bubbles are removed
d. Pour the Outer Skin Mixture into the mold making sure to start pouring at the lowest point over the areola. Pour all the material into the mold.
e. Slowly place the insert mold into position, making sure that the material doesn't overflow onto either the glove mold or the insert mold top.
f. Allow to cure for 3 hours at room temperature.
g. Remove insert, including Outer Skin and Glove Mold, from Mother Mold, and gently peel Glove mold and outer skin from Insert Mold. Do not separate Outer Skin from Glove mold
h. Place Glove Mold back into position on Mother Mold.

Secure Pathologies in Designated Places (Material Silicone 99-255)
a. Measure 10 g of Part B, add 10 g of Part A
b. Mix and Vacuum until all bubbles are removed
c. Place a small amount in the lump cavity, place lump in position, and hold in place until Silicone 99-255 starts to harden Manufacture Foam (Stroma/Fat Layer)
Prepare one breast at a time
a. Prepare the Foam Mixture (Materials: Soma Foama & TC 5005C)
  Measure 59.2 g of Soma Foama A, add 308 g of TC 5005C, mix until they are uniformly distributed
  Add 29.6 g Soma Foama B
  Mix until bubble formation and reaction begins, and mixture begins to thicken (approximately 5 minutes at 73° F.).
b. Transfer the mixture into the breast cavity, and continue mixing until the mixture begins to set.
c. Allow it to cure for 2 hours at room temperature.
d. If the foam expands above the height of the Outer Skin, trim it so that it sits just below it.

Manufacture Back Skin
a. Prepare the Back Skin Mixture for one breast (Material: Silicone 99-255):
  Measure 200 g Part B, add 10 drops (approximately 0.5 mL) FuseFX Light Skin, 10 drops (approximately 0.5 mL) FuseFX Tan Skin, 8 drops (approximately 0.4 mL) Fuse FX Warm Rosy Skin, 200 g Part A
  Mix and Vacuum
b. Pour the Back Skin Mixture over the foam until the level reaches just below the height of the Glove Mold
c. Burst all bubbles that form
d. Allow it to cure for at least 4 hours, 8-12 hours if possible, at room temperature.

Attach Hook-and-Loop Fastener (8 Inches in Length)
a. Place a thin Layer of Sil-poxy on the back of an approximately 8 inch hook or loop portion of a hook-and-loop fastener (e.g., Velcro), and position the Sil-poxy side of the hook or loop portion against the back skin of the breast.
b. If necessary, place a flat board with weight to flatten the hook or loop portion.
c. Allow to cure for 30 minutes.
d. Gently remove the breast from the mold, clean the mold release off the breast and apply talc.
e. Cut an 8 inch length of loop or hook portion of a hook-and-loop fastener (opposite of what was attached to the back skin) and connect it to the hook or loop portion that was attached to the back skin.

Example 3

Manufacture of Breast Model (E.G., Similar to Breasts 412, 414) with Medium Skin Tone Manufacture Areolas (Material: Silicone 99-255)
a. Clean the mold liberally and apply mold release
b. Measure 30 g of Part B, add 6 drops (approximately 0.3 mL) of FuseFX Warm Rosy skin, 15 drops (approximately 0.75 mL) of FuseFX Tan Flesh, 30 g Part A
c. Mix and Vacuum until all bubbles are removed.
d. Pour into areola molds
e. Cure in a 100° C. Oven for 30 minutes Manufacture Pathologies
a. Measure 30 g Part B, add 3 drops (approximately 0.15 mL) of FuseFX Tan Flesh, 12 drops (approximately 0.6 mL) of FuseFX Warm Rosy Skin, 30 g of Part A
b. Mix and Vacuum until all bubbles are removed
c. Pour into silicone lump molds
d. Cure in a 100° C. Oven for 30 minutes Manufacture Outer Skin
a. Prepare the Outer Skin Mixture for one breast (Material: Silicone 99-255):
  Measure 120 g Part B, add 6 drops (approximately 0.3 mL) FuseFX Light Skin, 6 drops (approximately 0.3 mL) FuseFX Tan Skin, 5 drops (approximately 0.25 mL) FuseFX Warm Rosy Skin, 120 g Part A
  Mix and Vacuum until all bubbles are removed
b. Pour the Outer Skin Mixture into the mold making sure to start pouring at the lowest point over the areola. Pour all the material into the mold.
c. Slowly place the insert mold into position, making sure that the material doesn't overflow onto the insert mold top.
d. Allow to cure for 30 minutes at 100° C.
e. Remove insert and clean the inner surface of the outer skin with isopropanol to remove any mold release residue.

Secure Pathologies in Designated Places (Material Silicone 99-255)
a. Measure 10 g of Part B, add 10 g of Part A
b. Mix and Vacuum until all bubbles are removed
c. Place a small amount in the lump cavity, place lump in position, and hold in place until Silicone 99-255 starts to harden
d. For the lump in Left Breast #2, when it is secured in place, coat the surface in a thin layer of Vaseline to prevent adherence to the foam layer.

Manufacture Foam (Stroma/Fat Layer)
Prepare one breast at a time
a. Prepare the Foam Mixture (Materials: Soma Foama & TC 5005C)
  Measure 29.6 g of Soma Foama A, add 154 g of TC 5005C, mix until they are uniformly distributed
  Add 14.8 g Soma Foama B
  Mix until bubble formation and reaction begins, and mixture begins to thicken (approximately 5 minutes at 73° F.).
b. Transfer the mixture into the breast cavity, and continue mixing until the mixture begins to set.
c. Allow it to cure for 2 hours at room temperature.
d. If the foam expands above the height of the Outer Skin, trim it so that it sits just below it.

Manufacture Back Skin
a. Prepare the Back Skin Mixture for one breast (Material: Silicone 99-255):
  Measure 220 g Part B, add 11 drops (approximately 0.55 mL) FuseFX Light Skin, 11 drops (approximately 0.55 mL) FuseFX Tan Skin, 9 drops (approximately 0.45 mL) Fuse FX Warm Rosy Skin, 220 g Part A
  Mix and Vacuum
b. Pour the Back Skin Mixture over the foam until the level reaches just below the height of the aluminum Mother Mold
c. Burst all bubbles that form
d. Allow it to cure for at least 4 hours, 8-12 hours if possible, at room temperature.

Gently remove the breast from the mold, clean the mold release off the breast and apply talc.

The foregoing outlines features of several embodiments so that those skilled in the art may better understand the aspects of the present disclosure. Those skilled in the art should appreciate that they may readily use the present disclosure as a basis for other devices that simulate natural biological tissue, including human tissue. In particular, the materials and methods of the present disclosure may be readily used in any application where the simulation of human skin, with or without underlying tissue structures, is desired. Such applications include, but are not limited to, manikins, sex toys, puppets, costumes, medical training devices, and/or other devices. In that regard, the methods described above for manufacturing the breast tissue models of the present disclosure may similarly be used with molds configured to make other simulated human body portions, including any part or portion of the body having skin (e.g., arms, legs, hands, feet, torso, head, male genitalia, and portions thereof) as well as internal structures (e.g., heart, liver, kidneys, pancreas, stomach, colon, bladder, female genitalia, other internal organs, and portions thereof). Those skilled in the art should also realize that such equivalent constructions do not depart from the spirit and scope of the present disclosure, and that they may make various changes, substitutions, and alterations to the embodiments disclosed herein without departing from the spirit and scope of the present disclosure. Also, it will be fully appreciated that the above-disclosed features and functions, and variations thereof, may be combined into other methods, systems, apparatus, or applications.

What is claimed is:

1. A polysiloxane mixture for simulating human biological tissue, the mixture comprising:
    a silicone foam, wherein the silicone foam comprises a closed cell silicone foam; and
    a silicone oil, wherein the silicone oil comprises a low molecular weight silicone oil;
    the silicone foam and the silicone oil combined in a manner such that the resulting mixture has physical material properties simulating a natural human biological tissue.

2. The polysiloxane mixture of claim 1, wherein the silicone foam is present in an amount of about 10 to 45 percent by weight of a total mixture weight, and the silicone oil is present in an amount of about 55 to 90 percent by weight of the total mixture weight.

3. The polysiloxane mixture of claim 2, wherein the silicone foam is present in an amount of about 25 percent by weight of the total mixture weight and the silicone oil is present in an amount of amount of about 75 percent by weight of the total mixture weight.

4. The polysiloxane mixture of claim 1, wherein the silicone oil has a viscosity of about 30 to 500 centipoise.

5. The polysiloxane mixture of claim 1, further comprising a silicone thermoset.

6. The polysiloxane mixture of claim 5, wherein the silicone foam and the silicone thermoset comprise a platinum catalyzed silicone.

7. The polysiloxane mixture of claim 5, wherein the silicone foam, the silicone oil, and the silicone thermoset are combined in a manner such that the resulting mixture has physical material properties simulating natural human breast tissue.

8. A human breast tissue model comprising:
    simulated breast tissue comprising a mixture of a silicone foam and a silicone oil; and
    a simulated skin layer covering the simulated breast tissue, the simulated skin layer comprising a first silicone thermoset;
    wherein the simulated breast tissue and the simulated skin layer are sized and shaped to mimic a natural human breast.

9. The human breast tissue model of claim 8, further comprising at least one simulated pathological structure imbedded within the simulated breast tissue, the at least one simulated pathological structure comprising a material different than the simulated breast tissue.

10. The human breast tissue model of claim 9, wherein the at least one simulated pathological structure simulates a pathology selected from a group consisting of a cyst, a medullary carcinoma, a ductal carcinoma, an infiltrating scirrhus carcinoma, a lobular carcinoma, and a fibroadenoma.

11. The human breast tissue model of claim 9, wherein the at least one simulated pathological structure comprises a second silicone thermoset.

12. The human breast tissue model of claim 11, wherein the second silicone thermoset of the at least one simulated pathological structure has a shore hardness of about 10 A.

13. The human breast tissue model of claim 8, further comprising at least one simulated anatomical structure imbedded within the simulated breast tissue at an anatomically appropriate location.

14. The human breast tissue model of claim 13, wherein the at least one simulated anatomical structure simulates an anatomical structure selected from a group consisting of a lymph node, a pectoralis muscle, and a rib.

15. The human breast tissue model of claim 8, wherein the first silicone thermoset of the simulated skin layer has a shore hardness of about 0010.

16. The human breast tissue model of claim 8, wherein the silicone oil has a viscosity of about 50 to 300 centipoise.

17. The human breast tissue model of claim 8, further comprising a fastener attached to a portion of the human breast tissue model, the fastener configured to affix the human breast tissue model to a base.

18. The human breast tissue model of claim 17, wherein the fastener is attached to the portion of the human breast tissue with an adhesive.

19. A method of manufacturing a biological tissue phantom, the method comprising:
    mixing a silicone oil with a silicone foam to form a blend;
    pouring the blend into a mold;
    stirring the blend until a foaming reaction starts; and
    allowing the blend to cure, wherein the cured blend has physical material properties simulating a natural human biological tissue.

20. The method of claim 19, further comprising adding a silicone thermoset to reduce the size and quantity of the foam cells.

21. The method of claim 19, wherein the silicone foam is a two-component platinum silicone foam.

22. The method of claim 19, wherein the silicone oil is a low molecular weight silicone oil.

23. The method of claim 19, wherein the amount of silicone oil that is mixed is about three times the amount of the silicone foam.

* * * * *